(12) United States Patent
Richardson et al.

(10) Patent No.: US 10,962,942 B2
(45) Date of Patent: Mar. 30, 2021

(54) PRESENCE TRIGGERED NOTIFICATIONS AND ACTIONS

(71) Applicant: Apple Inc., Cupertino, CA (US)

(72) Inventors: Andrew P. Richardson, San Francisco, CA (US); Adam J. Leonard, San Francisco, CA (US); Vinay A. Ramaswamy, San Jose, CA (US); Anush Nadathur, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/713,310

(22) Filed: Sep. 22, 2017

(65) Prior Publication Data
US 2018/0348718 A1    Dec. 6, 2018

Related U.S. Application Data

(60) Provisional application No. 62/514,903, filed on Jun. 4, 2017.

(51) Int. Cl.
*G05B 15/02* (2006.01)
*H04W 4/02* (2018.01)
(Continued)

(52) U.S. Cl.
CPC ............ *G05B 15/02* (2013.01); *G08B 21/22* (2013.01); *H04L 12/282* (2013.01);
(Continued)

(58) Field of Classification Search
CPC ........... G05B 15/02; G05B 2219/2642; H04W 4/029; H04W 4/021; H04L 12/2829; H04L 12/2821; H04L 12/282; G08B 21/22

See application file for complete search history.

(56) References Cited

U.S. PATENT DOCUMENTS 8,626,344 B2    1/2014   Imes et al.
2010/0289643 A1*  11/2010  Trundle ................ H04L 12/282
                                                   340/545.1
(Continued)

FOREIGN PATENT DOCUMENTS

EP        1102500         5/2001
EP        1102500 A3      1/2002
(Continued)

OTHER PUBLICATIONS

Winslow, Cori, Smart Homes, NYSERDA Advanced Buildings, Summer 2015, 46 pages.
(Continued)

*Primary Examiner* — Charles R Kasenge
(74) *Attorney, Agent, or Firm* — Kilpatrick, Townsend and Stockton LLP

(57) ABSTRACT

In some embodiments, a resident controller at a specified location performs a method including registering a plurality of mobile devices of a plurality of users and a device profile for a resident device to be controlled based on a location of the plurality of users, and establishing a user state for each of the plurality of users corresponding to their location. In some embodiments, the mobile devices can provide boundary-crossing signals when their location cross a boundary corresponding to the specified location causing the resident controller to update the user states based on the boundary-crossing signals and update a presence state of the specified location based on changes to the user states, where the device profile specifies a first action to be performed when the presence state transitions to a first presence value.

29 Claims, 11 Drawing Sheets

(51) Int. Cl.
*G08B 21/22* (2006.01)
*H04W 4/021* (2018.01)
*H04L 12/28* (2006.01)
*H04W 4/029* (2018.01)

(52) U.S. Cl.
CPC ...... *H04L 12/2821* (2013.01); *H04L 12/2829* (2013.01); *H04W 4/021* (2013.01); *H04W 4/029* (2018.02); *G05B 2219/2642* (2013.01)

(56) References Cited

U.S. PATENT DOCUMENTS

| | | | | |
|---|---|---|---|---|
| 2011/0290893 | A1* | 12/2011 | Steinberg | F24F 11/30 236/49.3 |
| 2012/0086562 | A1* | 4/2012 | Steinberg | G05D 23/1923 340/12.32 |
| 2012/0172027 | A1* | 7/2012 | Partheesh | H04W 4/021 455/420 |
| 2013/0144445 | A1* | 6/2013 | Steinberg | G05D 23/1923 700/278 |
| 2013/0155073 | A1 | 6/2013 | Khodorkovsky et al. | |
| 2013/0166073 | A1* | 6/2013 | Pine | F24F 11/30 700/276 |
| 2013/0234840 | A1* | 9/2013 | Trundle | G05B 15/02 340/12.53 |
| 2013/0331087 | A1* | 12/2013 | Shoemaker | H04L 67/125 455/420 |
| 2014/0039690 | A1* | 2/2014 | Steinberg | F24F 11/30 700/276 |
| 2014/0184406 | A1* | 7/2014 | Trundle | H04L 12/282 340/539.3 |
| 2014/0222210 | A1* | 8/2014 | Agarwal | G05B 15/02 700/275 |
| 2014/0229018 | A1* | 8/2014 | Steinberg | G05D 23/1923 700/276 |
| 2014/0313032 | A1* | 10/2014 | Sager | H04Q 9/00 340/539.17 |
| 2014/0320280 | A1* | 10/2014 | Sager | H04Q 9/00 340/501 |
| 2014/0320281 | A1* | 10/2014 | Sager | H04Q 9/00 340/501 |
| 2014/0320312 | A1* | 10/2014 | Sager | H04Q 9/00 340/870.16 |
| 2014/0327555 | A1* | 11/2014 | Sager | H04Q 9/00 340/870.16 |
| 2015/0072674 | A1* | 3/2015 | Shoemaker | H04L 67/125 455/420 |
| 2015/0140994 | A1* | 5/2015 | Partheesh | H04W 4/021 455/420 |
| 2015/0159895 | A1* | 6/2015 | Quam | H04L 67/025 700/275 |
| 2015/0159899 | A1* | 6/2015 | Bergman | H04L 67/025 700/276 |
| 2015/0159900 | A1* | 6/2015 | Quam | H04L 67/025 700/276 |
| 2015/0159901 | A1* | 6/2015 | Quam | H04L 67/025 700/276 |
| 2015/0159902 | A1* | 6/2015 | Quam | H04L 67/025 700/278 |
| 2015/0159903 | A1* | 6/2015 | Marak | H04L 67/025 700/278 |
| 2015/0159904 | A1* | 6/2015 | Barton | H04L 67/025 236/1 |
| 2015/0163631 | A1* | 6/2015 | Quam | H04L 67/025 455/456.1 |
| 2015/0163945 | A1* | 6/2015 | Barton | H04L 67/025 361/809 |
| 2015/0168001 | A1* | 6/2015 | Steinberg | F24F 11/30 236/51 |
| 2015/0301513 | A1* | 10/2015 | Sager | H04Q 9/00 700/90 |
| 2015/0302725 | A1* | 10/2015 | Sager | H04Q 9/00 340/870.16 |
| 2015/0310726 | A1* | 10/2015 | Sager | H04Q 9/00 340/539.13 |
| 2016/0202677 | A1* | 7/2016 | Trundle | H04L 12/282 700/275 |
| 2016/0217631 | A1* | 7/2016 | Petricoin, Jr. | G07C 9/00007 |
| 2016/0217638 | A1* | 7/2016 | Child | H04L 12/2803 |
| 2016/0234034 | A1* | 8/2016 | Mahar | H04L 12/282 |
| 2016/0261424 | A1* | 9/2016 | Gamberini | G05B 15/02 |
| 2016/0261425 | A1 | 9/2016 | Horton et al. | |
| 2016/0286033 | A1* | 9/2016 | Frenz | H04M 1/72572 |
| 2016/0313749 | A1* | 10/2016 | Frenz | G05B 19/106 |
| 2016/0313750 | A1* | 10/2016 | Frenz | H04W 4/021 |
| 2016/0316329 | A1* | 10/2016 | Frenz | H04W 4/021 |
| 2017/0031337 | A1 | 2/2017 | Jablokov et al. | |
| 2017/0076263 | A1 | 3/2017 | Bentz et al. | |
| 2017/0130979 | A1* | 5/2017 | Kolavennu | H04W 4/021 |
| 2017/0134896 | A1* | 5/2017 | Kolavennu | H04W 4/029 |
| 2017/0141848 | A1* | 5/2017 | Daoud | H04W 4/029 |
| 2017/0142124 | A1* | 5/2017 | Mukhin | G06F 21/30 |
| 2017/0171704 | A1* | 6/2017 | Frenz | H04W 4/021 |
| 2017/0171707 | A1* | 6/2017 | Frenz | H04W 4/021 |
| 2017/0180931 | A1* | 6/2017 | Frenz | H04W 4/021 |
| 2017/0181100 | A1* | 6/2017 | Kolavennu | H04W 4/029 |
| 2017/0191693 | A1* | 7/2017 | Bruhn | F24F 11/30 |
| 2017/0191695 | A1* | 7/2017 | Bruhn | G05B 15/02 |
| 2017/0238133 | A1* | 8/2017 | Partheesh | H04W 4/021 455/456.1 |
| 2017/0241660 | A1* | 8/2017 | Sekar | F24F 11/30 |
| 2017/0338974 | A1* | 11/2017 | Shoemaker | H04L 67/125 |

FOREIGN PATENT DOCUMENTS

| | | |
|---|---|---|
| EP | 2330470 | 6/2011 |
| EP | 2330470 B1 | 2/2013 |
| EP | 2955815 A1 | 12/2015 |
| WO | 2016119816 | 8/2016 |

OTHER PUBLICATIONS

European Patent Application No. 18174440.0, Extended European Search Report, dated Oct. 18, 2018, 8 pages.
Office Action issued in European Application No. EP18174440.0, dated Jul. 17, 2019 in 8 pages.
Office Action issued in China Application No. CN201810537735.6, dated Jun. 29, 2020 in 7 pages.

* cited by examiner

| TRIGGERING EVENT | TRIGGERING CONDITION | RESULTING ACTIONS |
|---|---|---|
| Enter/leave geofence | Always | Change accessory state |
| Accessory state change | Time/Date | Read/report accessory state |
| Time/Date | Weather condition | Send message to someone |
| Weather event | Presence/absence of user(s) | Initiate action on controller |
| Notification event | Accessory state | |
| Presence/absence of user(s) | Location | |

FIG. 4

| USER | CONTROLLER DEVICES | PERMISSIONS |
|---|---|---|
| Dad | Coordinator Device | Full |
| | Laptop | |
| | Phone | |
| | Tablet | |
| Dad | Set-top box | Basic |
| Mom | Tablet | Home |
| | Phone | |
| Jill | Laptop | Basic |
| | Phone | |
| Jack | Phone | Basic |
| Sitter | Phone | Guest |

FIG. 5

| User State |
|---|
| User 1 - Home |
| User 2 - Away |
| User 3 - Away |
| User 4 - Home |

| Presence State | Presence Value |
|---|---|
| Every User is Home | 0 |
| Some Users are Home incl. Primary | 1 |
| Some Users are Home (not Primary) | 2 |
| Nobody is Home | 3 |

FIG. 6

PRESENCE TRIGGERED NOTIFICATIONS AND ACTIONS

CROSS-REFERENCES TO RELATED APPLICATIONS

This application claims the benefit of U.S. provisional patent application No. 62/514,903, filed Jun. 4, 2017, which is herein incorporated by reference in its entirety for all purposes.

BACKGROUND

Recent developments in home automation or "smart homes" have provided users with unprecedented control over a wide range of accessory devices in the home. For instance, modern smart home technology can allow users to configure and control the automation of home lighting, heating (e.g., via smart thermostats), ventilation, air conditioning (HVAC), security (e.g., locks, cameras), home appliances (e.g., washers/dryers, ovens, etc.), and the like, from a single control center. In some systems, certain automated controls may rely on geo-fence data. Geo-fence data may correspond to a virtual perimeter for a real geographical area that, when crossed, can trigger an action by the home automated system (e.g., cause a light to turn on).

In some contemporary systems, a mobile device can track its location via an on-board global positioning system (GPS). The mobile device can send a notification to a smart home system when the GPS detects that the mobile device has traversed a preset geo-fence, which may trigger the action in the smart home, as noted above. Mobile devices typically include smart phones, smart watches, wearable technology, laptop computers, and the like.

Thus, recent smart home advancements have made homes safer and more energy efficient. However, implementations of home automation involving multiple users can result in undesirable functionality. As such, new advancements in smart home technology are needed.

SUMMARY

In a typical smart home system, resident accessory devices (e.g., lights, heating/cooling, locks, etc.) that implement aspects of home automation can be turned on or off based on a location of the user's mobile device. For example, the user's location can be determined based on the user's phone. When the user is close to home (e.g., as determined by a boundary of a geo-fence being crossed), a specified device (e.g., lights) can be configured to automatically turn on. Similarly, when a user leaves their home (e.g., as determined by the geo-fence boundary being crossed in the opposite direction), the specified device can be turned off. But, when a home has multiple users, the lights may get turned off when one user leaves (e.g., by triggering the geo-fence boundary), even though other people may remain in the house.

To avoid this problem, certain embodiments can track a presence state of the home itself. The home presence state can be determined based on user states of the individual users. For example, a user can create a profile for a particular resident device (e.g., a light), and define a first presence state corresponding to none of the users being home, and a second presence state corresponding to at least one of the users being home, such that the light can be automatically turned off when the first presence state is detected (no one is home) and the light can be turned on when the second presence state is detected (at least one person is home).

More specifically, some embodiments can include a method of controlling devices at a specified location (e.g., a user's home), which can include performing, by a resident controller (e.g., tablet computer), the steps of registering a plurality of mobile devices (e.g., smart phones) of a plurality of users, registering a device profile for a resident device (e.g., smart thermostat) to be controlled based on a location of the plurality of users, the resident device communicably coupled with the resident controller that is at the specified location, and establishing a user state for each of the plurality of users, wherein the user state specifies whether the user is at the specified location. The method can include receiving boundary-crossing signals from the plurality of mobile devices, where a boundary-crossing signal specifies when one of the mobile device crosses a boundary (e.g., geo-fence) around the specified location, updating the user states based on the boundary-crossing signals, updating a presence state of the specified location based on changes to the user states, where the device profile specifies a first action (e.g., set an ambient temperature) to be performed when the presence state transitions to a first presence value, and sending a control signal to the resident device to perform the first action when the presence state changes to the first presence value.

The resident controller can be any suitable computing device, typically based at the specified location, that can include a laptop computer, desktop computer, tablet computer, entertainment system (e.g., Apple TV®), or the like. A device can be any controllable electronic device, typically related to an application of home automation including, but not limited to, smart lights, locks, appliances, HVAC, security cameras, and the like. Mobile devices may typically include smart phones, smart wearables (e.g., smart watches, glasses, etc.), personal digital assistants, etc. In some cases, the first presence value can be that all of the user states are at the specified location (e.g., everyone is home; set the temperature to 70° F.), or that none of the user states are at the specified location (e.g., nobody is home; set the temperature to 60° F.). The specified location can be a home, a particular room of a home, a combination of rooms, or in some cases, commercial sites or other non-residential settings. Each user is typically associated with a single mobile device, although multiple mobile devices per user are possible. Furthermore, the first action may correspond to performing an automation of the resident device at the specified location (e.g., turning off a hall light); or sending a notification to one or more of the mobile devices, the notification corresponding to the presence state (e.g., notify a resident of the home that no one is home and the lights are turned off). Communication between the resident controller and controllable device can be implemented by any suitable wired or wireless communication protocol including, but not limited to, Bluetooth®, Bluetooth LE®, X10, Ethernet, RS-485, 6LoWPAN, ZigBee, Z-Wave, or the like, as would be understood by one of ordinary skill in the art.

The following detailed description together with the accompanying drawings will provide a better understanding of the nature and advantages of aspects of the present invention.

BRIEF DESCRIPTION OF THE DRAWINGS

FIG. 4 shows a table listing options for defining action sets and triggers, according to certain embodiments.

FIG. 5 is a table that provides an access list for an environment model, according to certain embodiments.

FIG. 6 shows aspects of a user state and presence state table, according to certain embodiments.

DETAILED DESCRIPTION

Figure 1:
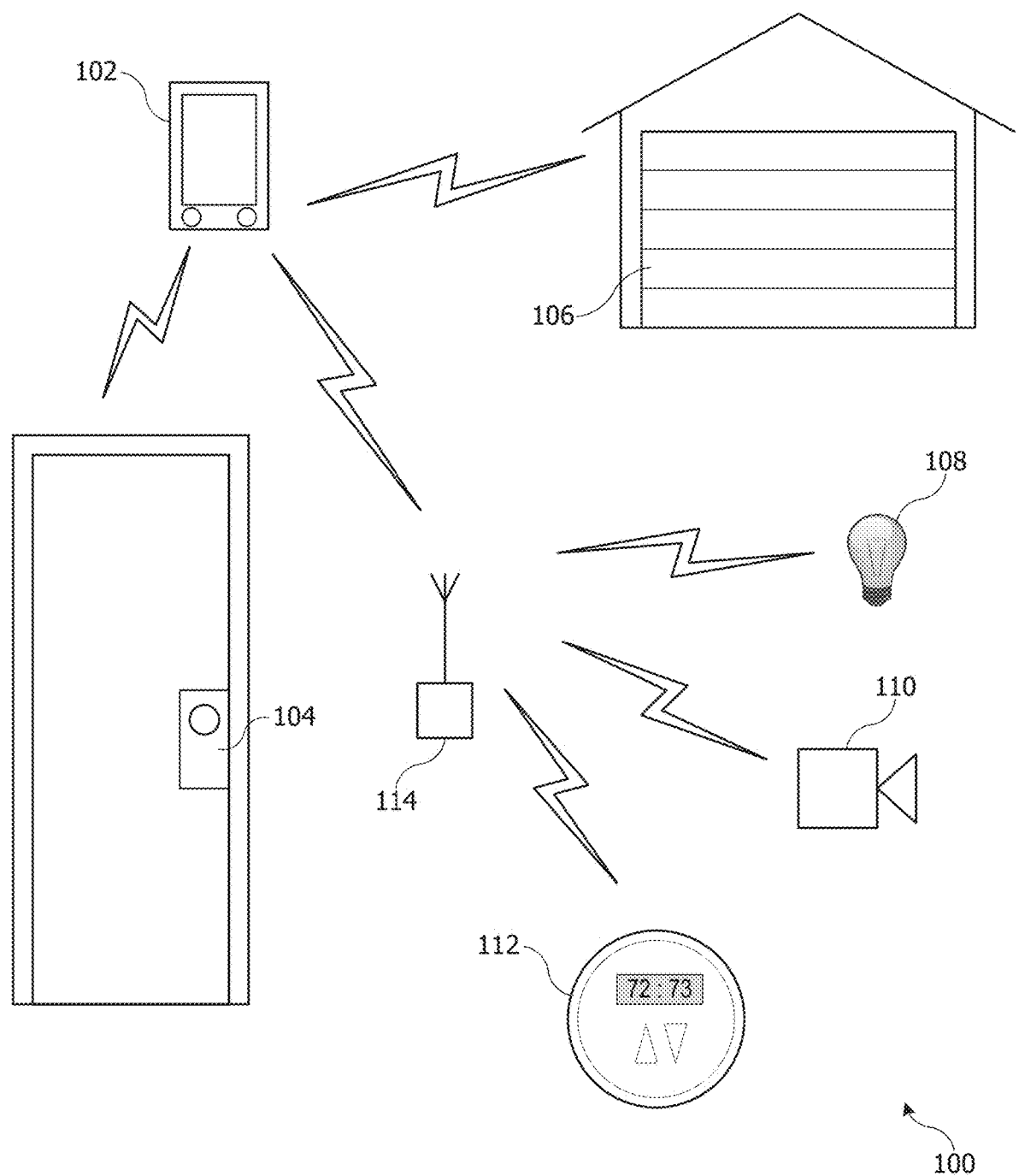
FIG. 1 shows a home environment, according to certain embodiments.

Aspects of the present disclosure relate generally to device automation, and in particular to presence triggered notifications and actions in a home automation system, according to certain embodiments.

In the following description, various embodiments of a home automation will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

In some embodiments, systems and methods can autonomously control certain devices (e.g., smart lights, thermostat, locks, etc.) at a specified location (e.g., a user's home) based on a location of multiple mobile devices (e.g., smart phones) with respect to a preset boundary (e.g., geo-fence). This can be achieved by tracking a presence state of the location itself, which can be based on user states of the individual users. For example, a user can create a profile for a particular resident device (e.g., a light), and define a first presence state corresponding to none of the users being home (i.e., mobile device is not home), and a second presence state corresponding to at least one of the users being home, such that the light can be automatically turned off when the first presence state is detected (no one is home) and the light can be turned on when the second presence state is detected (at least one person is home). A resident controller (e.g., computing device), which may be based at the specified location, can be communicatively coupled with the mobile devices and resident devices to manage the communication with the mobile devices (e.g., receive geofence crossing alerts), the control of the resident devices (e.g., turning on and off lights, locking/unlocking doors, etc.), sending notifications (e.g., informing users that certain devices have been turned on/off), and managing various state tables, permission tables, and the like.

The resident controller can be any suitable computing device, typically based at the specified location, that can include a laptop computer, desktop computer, tablet computer, entertainment system (e.g., Apple TV®), or the like. A device can be any controllable electronic device, typically related to an application of home automation including, but not limited to, smart lights, locks, appliances, HVAC, security cameras, and the like. Mobile devices may typically include smart phones, smart wearables (e.g., smart watches, glasses, etc.), personal digital assistants, etc. The specification location can be a home, a particular room of a home, a combination of rooms, or in some cases, commercial sites or other non-residential settings. Communication between the resident controller and controllable device(s) can be implemented by any suitable wired or wireless communication protocol including, but not limited to, Bluetooth®, Bluetooth LE®, X10, Ethernet, RS-485, 6LoWPAN, ZigBee, Z-Wave, or the like, as would be understood by one of ordinary skill in the art.

Example Environment

Certain embodiments can operate in the context of protocols for communication between a resident controller device (or "controller") and any number of other electronic devices that are to be controlled (referred to herein as "accessory devices" or simply "accessories"). A controller can be implemented, for example, on a general purpose computing device such as a desktop computer, laptop computer, tablet computer, smart phone, other mobile phone, other handheld or wearable computing device, or the like, by providing the general purpose computing device with appropriate executable program code; alternatively, a controller can be a special purpose computing device. An accessory device can include any device that is controllable by a controller. Examples of accessories can include, but are not limited to, light fixtures, thermostats, door locks, automatic door openers (e.g., garage door opener), still or video cameras, sound systems, appliances, and so on. Accessories and controllers can communicate with each other via wired or wireless channels using any standard transport protocols such as Wi-Fi, Bluetooth, Bluetooth LE, ZigBee, Z-Wave, or the like, or any suitable proprietary transport protocol. It is to be understood that other communication protocols and transports can be used. Some embodiments can relate to accessory networks, where an accessory network can be a group of accessories that are commonly controlled by the same controller (or set of controllers such as a controller network). The accessory network can provide features and options to coordinate control of multiple accessories, as further discussed below.

FIG. 1 shows a smart home environment 100, according to certain embodiments. Home environment 100 can include a controller 102 that can communicate with various accessory devices located in the environment. Controller 102 can include, for example, a desktop computer, laptop computer, tablet computer (e.g., iPad®), smart phone, wearable computing device (e.g., smart watch, smart eye wear, etc.), personal digital assistant, home entertainment device (e.g., AppleTV®), smart speaker, or any other computing device or set of devices that is capable of communicating command-and-control messages to accessories (e.g., as described in U.S. Provisional Application No. 61/935,967 and U.S. application Ser. No. 14/614,914, which are hereby incorporated by reference in their entirety for all purposes)

and presenting a user or voice interface to allow a user to indicate desired operations of the accessories. In some embodiments, controller 102 can be implemented using multiple discrete devices. For example, there can be a base station that communicates with accessories and that can be installed in a fixed location in environment 100, and one or more mobile remote control stations (e.g., a handheld or wearable device such as a mobile phone, tablet computer, smart watch, eyeglasses, etc.) that provide a user interface and communicate with the base station to effect control over accessories. In some embodiments, the base station can function as a coordinator or proxy, as would be understood by one of ordinary skill in the art with the benefit of this disclosure.

Any type of accessory device can be controlled. Examples of accessory devices can include, but are not limited to, a door lock 104, garage door system 106, light fixture 108, security camera 110, and thermostat 112. In some instances, controller 102 can communicate directly with an accessory; for instance, controller 102 is shown communicating directly with door lock 104 and garage door system 106. In other instances, controller 102 can communicate through an intermediary device. For instance, controller 102 is shown communicating via a wireless network access point 114 with accessories 108, 110, 112, that are on a wireless network provided by access point 114. As noted above, in some embodiments, controller 102 can include a base station, and base station functionality can be integrated into access point 114 or into one of the accessories that is to be controlled (e.g., thermostat 112). In some embodiments, an intermediary can function as a proxy or coordinator.

Various communication transports and combinations of transports can be used, and different transports can be used with different accessory devices. For instance, some wireless transports such as the Bluetooth® Classic or Bluetooth® Smart communication protocol and standards promulgated by the Bluetooth SIG (referred to herein as "Bluetooth" and "Bluetooth LE") can support direct point-to-point communication between devices within a limited range. Other wireless transports, such as a wireless network complying with Wi-Fi® networking standards and protocols promulgated by the Wi-Fi Alliance (referred to herein as a "Wi-Fi network") can define a wireless network with a central access point that routes communications between different devices on the network. Other wireless communication protocols can include ZigBee®, Z-Wave®, infra-red (IR), or any suitable RF-based protocol, as would be understood by one of ordinary skill in the art. Further, while wireless communication transports are shown, wired transports can also be provided for some or all of the accessories. For example, light bulb 108 can be connected to access point 114 by a wired connection, and controller 102 can communicate with light bulb 108 by sending messages wirelessly to access point 114, which can deliver the messages to light bulb 108 via the wired connection. Other combinations of wired and wireless communication are also possible.

In some embodiments, a uniform accessory protocol can facilitate communication by a controller 102 with one or more accessories 104-112. The protocol can provide a simple and extensible framework that models an accessory as a collection of services, with each service being defined as a set of characteristics, each of which having a defined value at any given time. Various characteristics can represent various aspects of the accessory's state. For example, in the case of thermostat 112, characteristics can include power (on or off), current temperature, and target temperature. In some embodiments, message formats may be transport-dependent while conforming to the same accessory model. Examples of an accessory model based on services and characteristics are described in above-referenced U.S. Provisional Application No. 61/935,967 and U.S. application Ser. No. 14/614,914.

The protocol can further define message formats for controller 102 to send command-and-control messages ("requests" or "control signals") to accessory 112 (or other accessories) and for accessory 112 to send response messages to controller 102. The command-and-control messages can allow controller 102 to interrogate the current state of accessory characteristics and in some instances to modify the characteristics (e.g., modifying the power characteristic can turn an accessory off or on). Accordingly, any type of accessory, regardless of function or manufacturer, can be controlled by sending appropriate messages. The format can be the same across accessories. Examples of message formats are described in above-referenced U.S. Provisional Application No. 61/935,967 and U.S. application Ser. No. 14/614,914.

The protocol can further provide notification mechanisms that allow accessory 112 (or other accessories) to selectively notify controller 102 in the event of a state change. Multiple mechanisms can be implemented, and controller 102 can register, or subscribe, for the most appropriate notification mechanism for a given purpose. Examples of notification mechanisms are described in above-referenced U.S. Provisional Application No. 61/935,967 and U.S. application Ser. No. 14/614,914.

It will be appreciated that home environment 100 is illustrative and that variations and modifications are possible. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc. Any type of accessory device can be controlled, including but not limited to door locks, door openers, lighting fixtures or lighting systems, switches, power outlets, cameras, environmental control systems (e.g., thermostats and HVAC systems), kitchen appliances (e.g., refrigerator, microwave, stove, dishwasher), other household appliances (e.g., clothes washer, clothes dryer, vacuum cleaner), entertainment systems (e.g., TV, stereo system), windows, window shades, security systems (e.g., alarms), sensor systems, and so on. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive updates) the service and/or its characteristics. Accordingly, protocols and communication processes used in embodiments of the invention can be uniformly applied in any context with one or more controllers and one or more accessories, regardless of accessory function or controller form factor or specific interfaces.

Example Network Configuration

Figure 2:
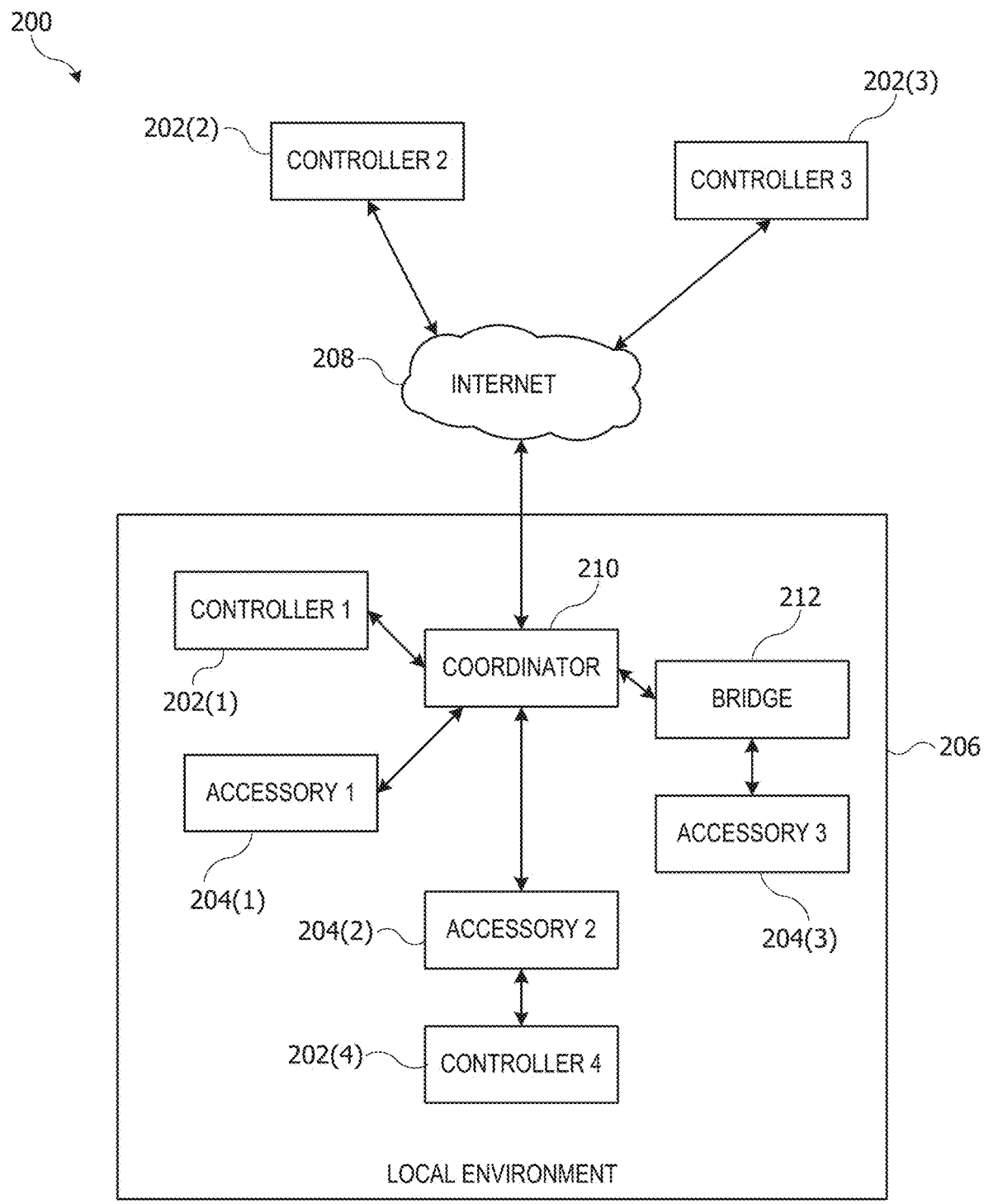
FIG. 2 shows a network configuration for a smart home system, according to certain embodiments.

FIG. 2 shows a network configuration 200 for a smart home system, according to certain embodiments. Configuration 200 allows controllers 202 to communicate with accessories 204 located in local environment 206 (e.g., a home environment) through a coordinator 210. Each controller 202 can be an electronic device (e.g., smart phone, smart wearable, etc.) owned and/or operated by a user who frequents environment 206 (e.g., a resident of the home or a regular visitor to the home). Controllers 202 can each be similar to controller 102 of FIG. 1, and accessories 204 can be similar to various accessories shown in FIG. 1.

Accessories 204 can each communicate with a coordinator device ("coordinator" 210 that can be located within local environment 206. As used herein, a "coordinator" can be an electronic device that is capable of operating as a controller of accessories 204 as well as relaying messages from other controllers (e.g., controllers 202) to accessories 204. In some embodiments, coordinator 210 can be an "intelligent" device that can coordinate operations among multiple controllers and/or accessories and is not limited to passively relaying messages. Coordinator 210 can be any device that is capable of presenting itself as a controller to accessories 204 and that is capable of communicating securely with controllers 202 (e.g., messaging, data transfer, geo-fence alerts, etc.). In some embodiments, coordinator 210 can be a device that is expected to stay in local environment 206 and that is expected to be powered on and available for communication most or all the time. (It is to be understood that coordinator 210 can occasionally be unavailable, e.g., in connection with software or firmware upgrades, power outages, or other intermittent occurrences.) For example, coordinator 210 can be implemented in a tablet computer, desktop computer, a Wi-Fi or access-point unit, a dedicated accessory-control base station, a set-top box (e.g., Apple TV®) for a television or other appliance (which can implement base station functionality in addition to interacting with the television or other appliance), or any other suitable electronic device as desired.

In some embodiments, coordinator 210 and accessories 204 can communicate using a local area network (LAN), such as a Wi-Fi network and/or a point-to-point communication medium such as Bluetooth LE. It is to be understood that other communication protocols can be used. In some embodiments, controllers 202, accessories 204, and coordinator 210 can support a uniform accessory protocol as described above that can be supported using both Wi-Fi and Bluetooth LE as transports.

In the example of FIG. 2, controllers 202(1) and 202(4) are currently located in local environment 206 with accessories 204 and coordinator 210. For example, controller 202(1) can be on the same LAN as accessories 204 and coordinator 210. Controllers 202(2) and 202(3) are currently located outside local environment 206 but are connected to a communication network 208 (e.g., the Internet); such controllers are said to be "remote" from accessories 204 and coordinator 210. It is to be understood that controllers 202 can be mobile devices that are sometimes within local environment 206 and sometimes outside local environment 206. Accessories 204 need not be mobile and need not be connected to communication network 208. In some embodiments, coordinator 210 can be connected to communication network 208 and can permit remote access to accessories 204 by remote controllers 202(2) and 202(3).

In the example shown, controllers 202 can communicate with accessories 204 via coordinator 210, and coordinator 210 can be said to act as a "proxy" for accessories 204. Coordinator 210 can communicate directly with accessories 204(1) and 204(2). In the case of accessory 204(3), coordinator 210 can communicate via "bridge" 212. Bridge 212 can operate to relay commands between a controller and an accessory; in some embodiments, bridge 212 can also translate between different communication protocols used by coordinator 210 or controller 202 and accessory 204(3). Further, in some embodiments, bridge 212 can be implemented as a "tunnel" that can provide secure end-to-end communication between coordinator 210 and accessory 204 (3). Examples of proxies, bridges, and tunnels are described in above-referenced U.S. Provisional Application No. 62/005,764, U.S. Provisional Application No. 62/094,391, and U.S. application Ser. No. 14/725,891.

In network configuration 200, controllers 202 can be configured to communicate with accessories 204 via coordinator 210 whenever possible. Thus, as shown, controller 202(1), which is in local environment 206, communicates with coordinator 210 rather than directly with accessories 204, as do remotely located controllers 202(2) and 202(3). Direct communication between any of controllers 202 and accessories 204 can be limited, e.g., to situations where coordinator 210 is not available. In other embodiments, controllers 202 may communicate directly with accessories 204 whenever they happen to be in range of each other (e.g., on the same Wi-Fi network or within Bluetooth range). For instance, as shown, controller 202(4) can communicate directly with accessory 204(2). However, in many of the figures and examples that follow, communication (e.g., control) between accessories 204 and controllers 202 is done through coordinator 210.

In some embodiments, coordinator 210 can be used to coordinate access by multiple controllers 202 to multiple accessories 204. For example, rather than establishing a pairing between each controller 202 and each accessory 204, controllers 202 can each establish a pairing with coordinator 210, and coordinator 210 can establish a pairing with each accessory 204. The same pair setup and/or pair add processes used to establish a controller-accessory pairing can also be used to establish a controller-coordinator pairing, with the coordinator acting in the role of accessory. For purposes of coordinator-accessory pairing, the coordinator can assume the role of controller. Thus, coordinator 210 can present itself as an accessory when communicating with a controller (e.g., any of controllers 202) and as a controller when communicating with an accessory (e.g., accessory 204).

In some embodiments, coordinator 210 can manage permissions associated with the accessory network or environment model to limit access by specific controllers 202 to some or all accessories 204. In some embodiments, controllers 202 can preferentially route all requests to accessories 204 through coordinator 210, and in some embodiments, accessories 204 can be configured to communicate directly only with coordinator 210 and to ignore requests that come directly from controllers 202. This can allow coordinator 210 to enforce permissions and other restrictions on access to accessories 204.

Centralizing communication with accessories through coordinator 210 can simplify management of a controller network and/or accessory network (e.g., controllers 202 and accessories 204 in local environment 206). For example, if a new accessory is acquired, the new accessory need only establish a pairing with coordinator 210 in order to allow all controllers 202 to have access to the new accessory. Similarly, if a new controller 202 is acquired, the new controller 202 need only establish a pairing with coordinator 210 to allow the new controller to have access to all accessories 204. In an environment with multiple controllers (e.g., a family where the members each have multiple devices) and perhaps dozens of accessories, the time saving can be considerable.

It will be appreciated that network configuration 200 is illustrative and that variations and modifications are possible. Any number of controllers and any number of accessories can be included in a network configuration. In some embodiments, coordinator 210 can be replaced with a proxy that relays messages between controllers and accessories without necessarily reading the content of the messages. In some embodiments, coordinator 210 can be omitted entirely. Some or all of accessories 204 may be accessible only within the local environment. Further, as described below, different controllers 202 may have different levels of permission in regard to accessing accessories 204; for instance, remote access via network 208 may be permitted for some controllers 202 but not for other controllers 202.

Geo-Fence Based Home Automation

A geo-fence ("virtual boundary" or "boundary") can be a virtual fence that a user can configure on their GPS-enabled smart device to, for example, trigger an action when the smart device (or other participating device) crosses the geo-fence. As discussed above, geo-fences can be used in home automation where a geo-fence trigger ("boundary-crossing" signal) may cause one or more accessory devices (e.g., lights, door locks, thermostat) at a specific location (e.g., user's home) to change a mode of operation (e.g., turn on/off, change operational setting, etc.). In some implementations, a notification can be sent to one or more users (e.g., a home resident's mobile device) to indicate that a change to a home automation setting has occurred. A coordinator device may operate as a primary controller and intermediary for all accessories and controller devices, however direct communication between controllers and accessories are possible, as indicated above. It should be noted that although the following examples provide a geo-fence based home automation system, some embodiments may alternatively or additionally use other signals to indicate when a user's mobile device has arrive or left a location (e.g., home), potentially in tandem to provide further accuracy and reliability. Other signals could be included if the user's device detects nearby accessories that are known to be at the home, or if an accessory in the location (e.g., home) recognizes a particular user (e.g., security camera). One of ordinary skill in the art would understand the many variations, modifications, and alternative embodiments thereof.

Figure 3A:
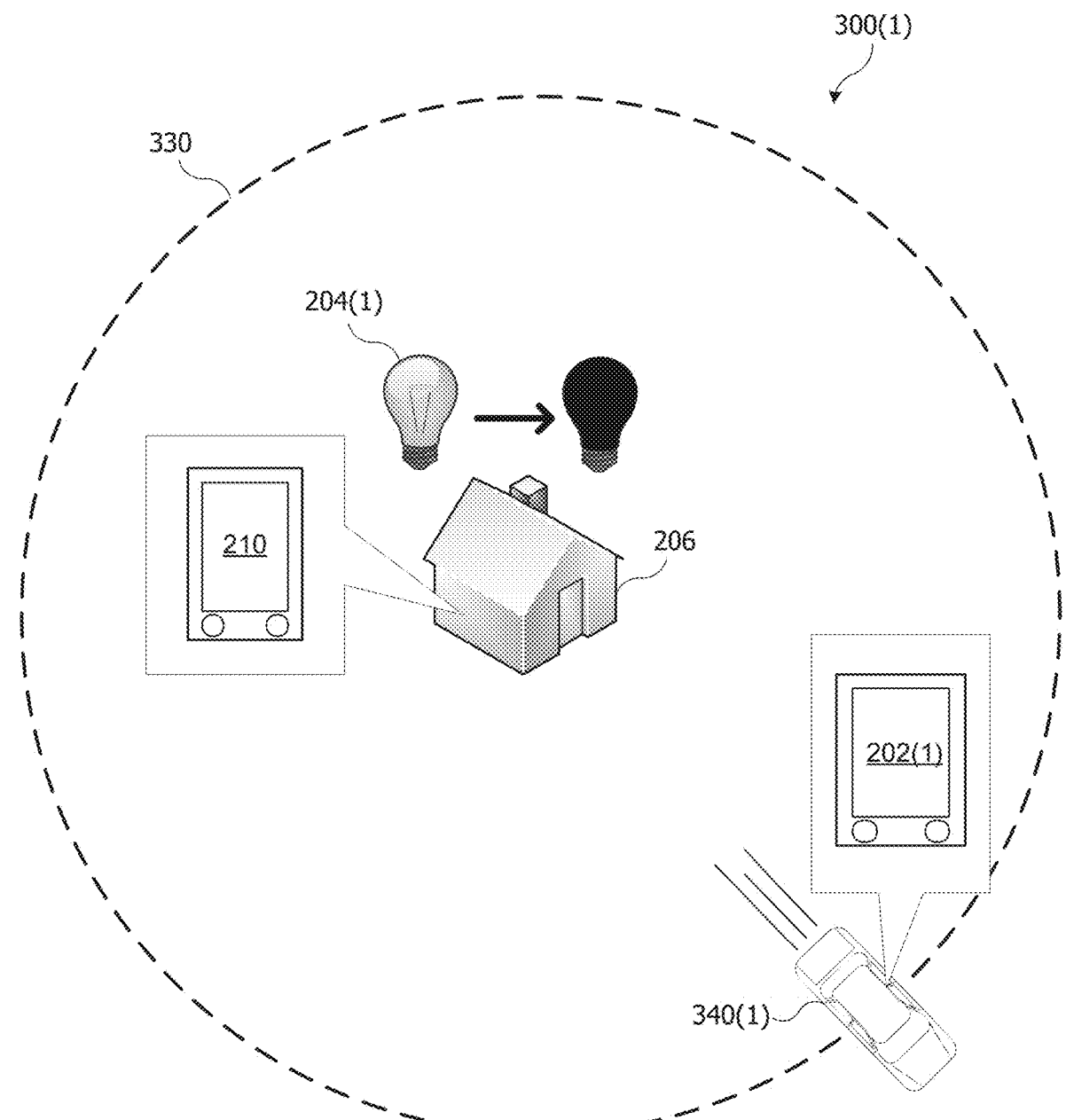
FIG. 3A shows a geo-fence-triggered home automation system configured for a single user.
Figure 3B:
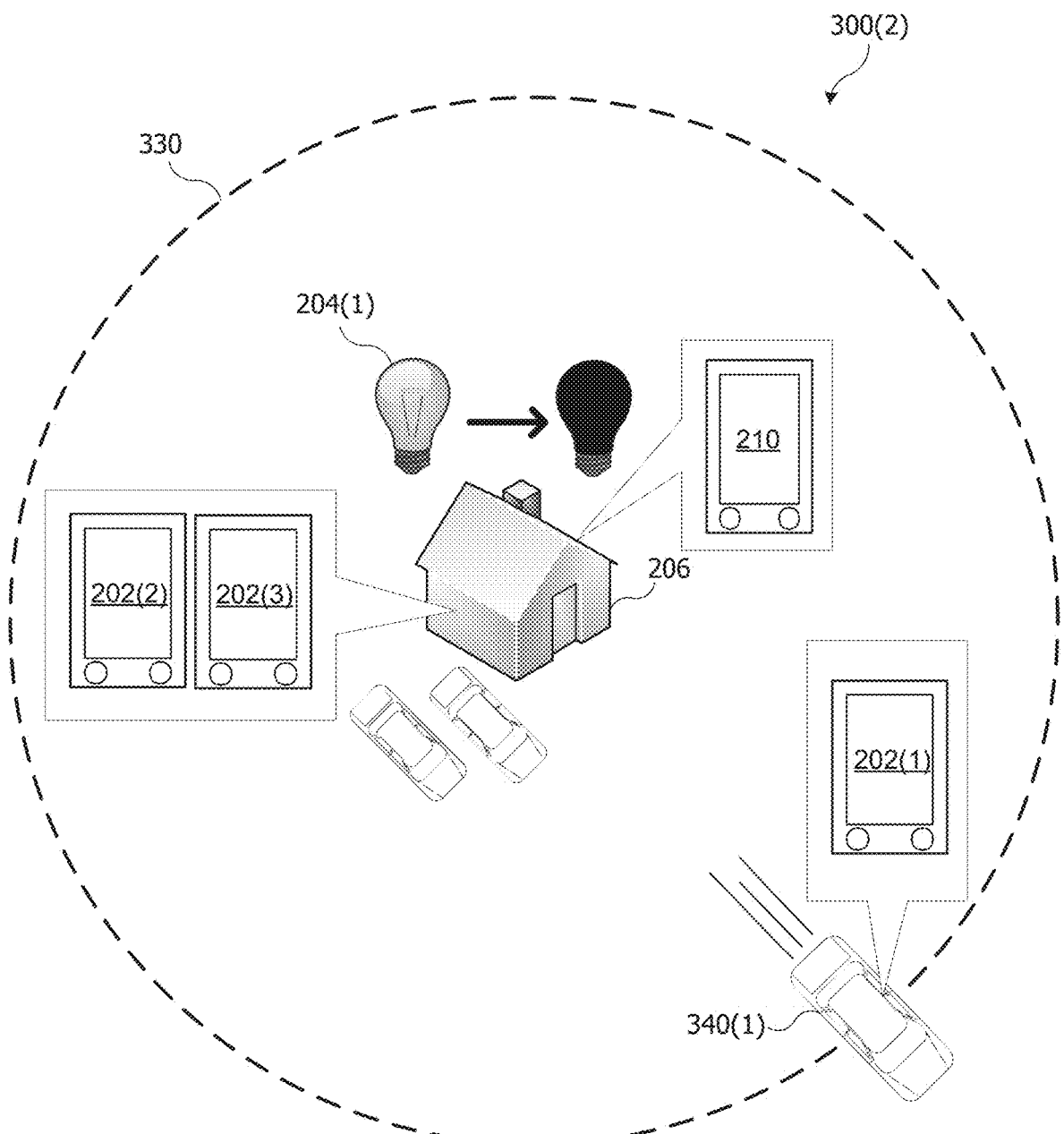
FIG. 3B shows a geo-fence-triggered home automation system configured for multiple users.
Figure 3C:
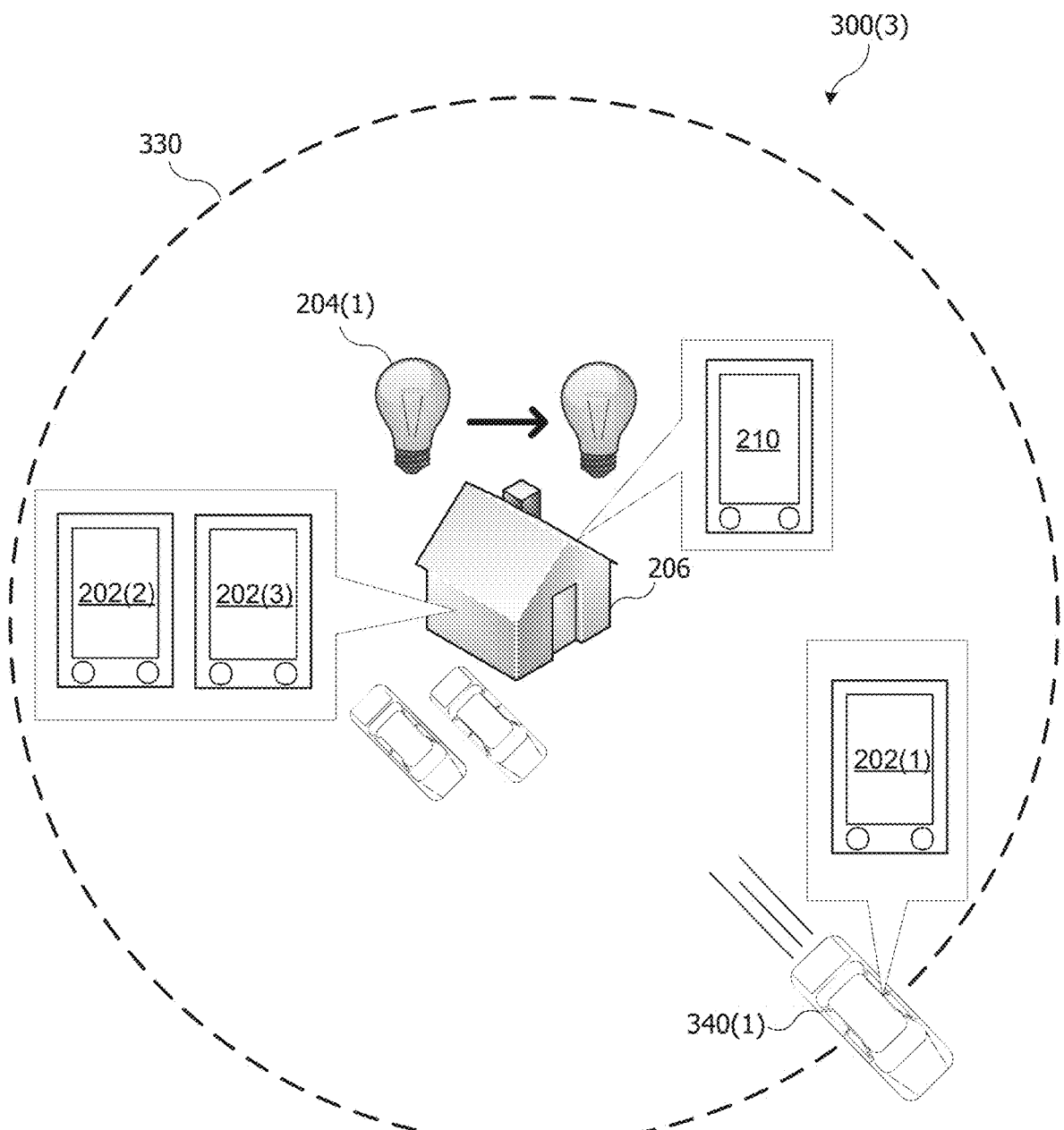
FIG. 3C shows a geo-fence-triggered home automation system configured for multiple users, according to certain embodiments
Figure 3D:
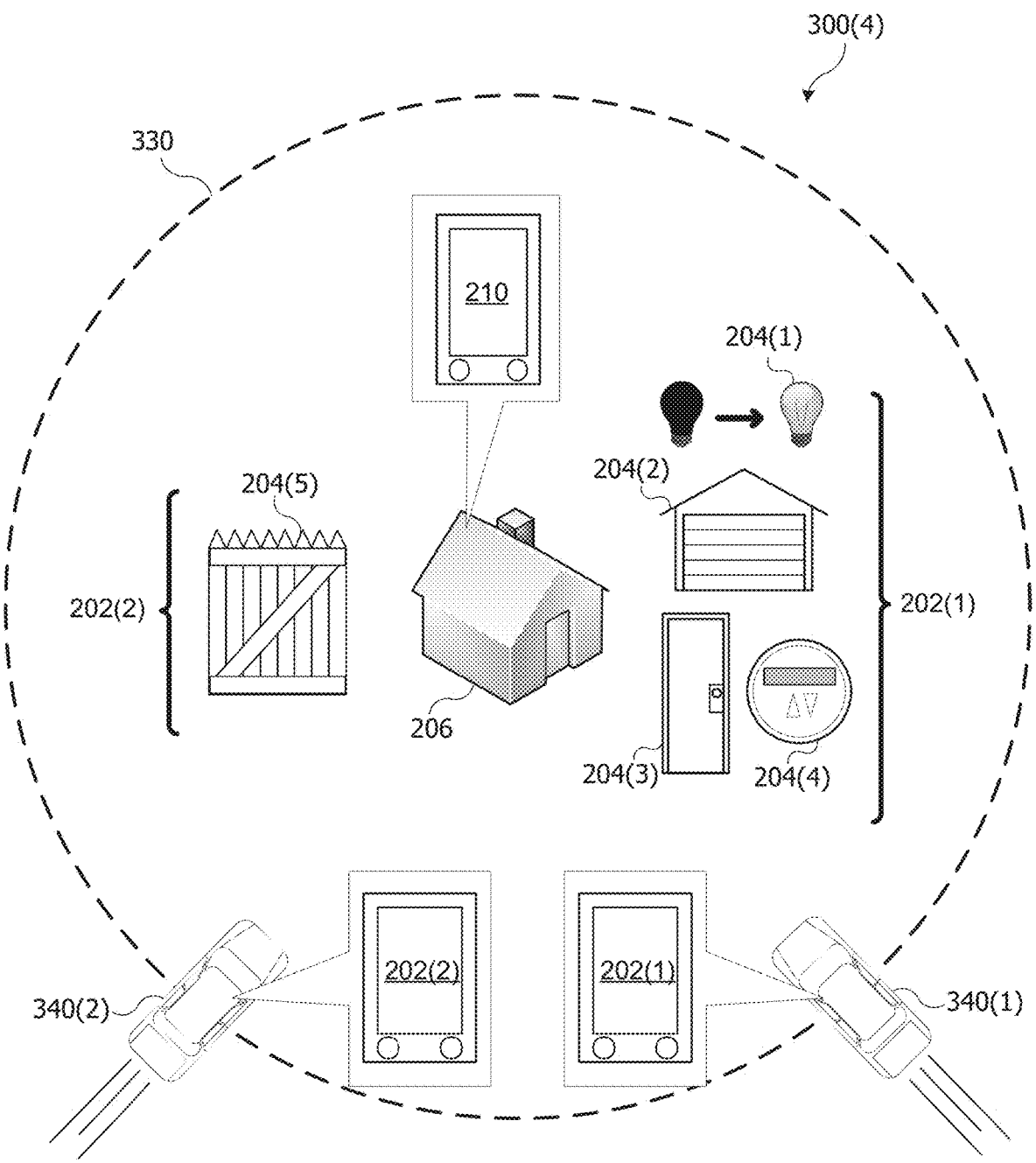
FIG. 3D shows a geo-fence-triggered home automation system configured for multiple users with different permission settings, according to certain embodiments.
Figure 3E:
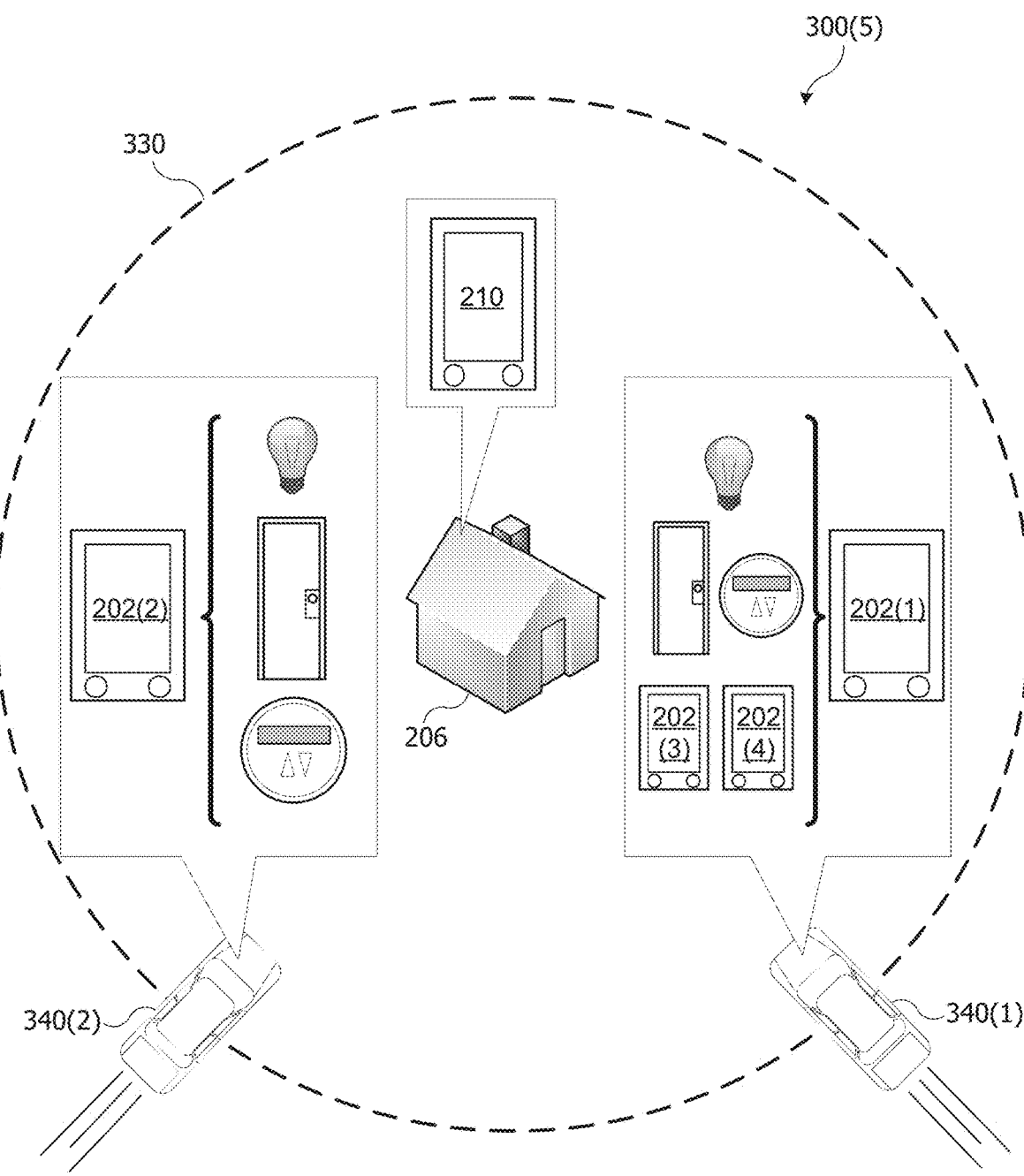
FIG. 3E shows a geo-fence-triggered home automation system configured for multiple users with different notification settings, according to certain embodiments.

The following descriptions of FIGS. 3A-3E illustrate various shortcomings of conventional home automation systems having multiple users (FIGS. 3A-3B), as well as novel solutions to those shortcomings, as described in certain embodiments that follow (FIGS. 3C-3E). For instance, FIGS. 3A-3B show how boundary crossing signals from multiple users may result in undesired functionality in certain situations. FIG. 3C shows how multiple users can be supported for a home automation system, according to certain embodiments. FIG. 3D shows how different users can be granted different levels of control, such that some users may enjoy full access to all of the available automated features, configuring permissions, and messaging capabilities, while other users may be restricted to a limited set of functions, according to certain embodiments. FIG. 3E shows how different users may be granted different permissions and/or levels of system control. For instance, some users (e.g., a resident landlord) may not only have full control of the smart home automation capabilities, but may also receive notifications of when specific users are present in the home. In contrast, other users (e.g., a tenant) may have access to some automation capabilities, but may not receive any notifications of the whereabouts of the other residents. These examples that follow are meant to be illustrative and not limiting, and those of ordinary skill in the art with the benefit of this disclosure would understand and appreciate the many variations, modifications, and alternative embodiments thereof.

FIG. 3A shows a geo-fence-triggered home automation system 300(1) configured for a single user. Local environment ("Smart home environment" or "home environment") 206 can include accessory device 204(1) (e.g., a smart light) controlled by coordinator 210 (e.g., tablet computer) and controller 202(1). Coordinator 210 can be any suitable electronic device capable of operating as a controller of accessories at home environment 206 and relaying messages from other controllers to accessories 204, as further discussed above with respect to FIG. 2. Geo-fence 330 can be set by coordinator 210 or controller 202(1) to be any suitable dimension (e.g., 100 m radius around home environment 206). Geo-fences can be configured in any desired shape and may conform to any desired boundary (e.g., property lines, land features, etc.), as would be understood by one of ordinary skill in the art.

In the simplified example of FIG. 3A, a smart light (accessory device 204(1)) is configured to turn on and off when a mobile device (controller 202(1)) crosses a geo-fence trigger. For example, when a user (resident) 340(1) leaves home environment 206 330 (e.g., by vehicle) with controller 202(1) and crosses geo-fence 330 (i.e., user 340(1) leaves the bounded region), a boundary-crossing signal may be sent from controller 202(1) to coordinator 210 that causes accessory 204(1) to automatically switch from an "on" state to an "off" state (or remain in an "off" state if it was already turned off). Similarly, when a user crosses geo-fence and enters its bounded region, a boundary-crossing signal may be sent from controller 202(1) to coordinator 210 that causes accessory 204(1) to automatically switch from an "off" state to an "on" state (or remain in an "on" state). Home automation systems that incorporate geo-fence-based automations and are controlled by a single controller can work well, however undesirable functionality may result when multiple controllers are used, as shown and described below with respect to FIG. 3B.

FIG. 3B shows a geo-fence-triggered home automation system 300(2) configured for multiple users. FIG. 3B illustrates the problem where one user leaves a smart home and triggers a geo-fence (i.e., leaves a geo-fence bounded area), which may cause an accessory to change its state while other users (and their corresponding controllers 202(2) and 202(3)) are still home. Similarly, undesirable accessory automations may occur when a user enters a geo-fence bounded area and causes an automation to occur with other users already present at the home. Further, even more complications may result if each user has a different set of automations associated with their mobile device (controller), as further discussed below.

Referring to FIG. 3B, home automation system 300(2) can include home environment 206, coordinator 210 stationed within home environment 206, controllers 202(2) and 202(3) located within home environment 206, geo-fence boundary 330, user 340(1) and controller 202(1) leaving the bounded region defined by geo-fence boundary 330, and accessory device 204(1) controlled by any of controllers 202(1)-202(3) and/or coordinator 210. Any number of controllers, accessory devices, and/or geo-fence arrangements are possible, as further discussed above with respect to FIG. 2. In FIG. 3B, controller 202(1) leaves the bounded region defined by geo-fence 330 and sends a boundary-crossing signal to coordinator 210, which causes accessory 204(1) to switch from an "on" state to an "off" state. However, two users (and their corresponding controllers 202(2) and 202(3)) remain at home environment 206 with the lights turned off. This problem can be exacerbated when many accessories are configured for geo-fence-based automations (e.g., setting a thermostat, locking/unlocking doors, setting security systems to "away" mode with people present, etc.). To solve this problem, a user state for each of a plurality of users (and their corresponding controller devices) can be tracked and stored, for example, in one or more databases. The coordinator device can then determine a presence state (e.g., who is home) for the home environment to determine whether an action should occur (e.g., turn the lights off when nobody is home) or not occur (e.g., leave the lights on because other users are home), as further described below.

FIG. 3C shows a geo-fence-triggered home automation system 300(3) configured for multiple users, according to certain embodiments. Home automation system 300(2) can include home environment 206, coordinator 210 stationed within home environment 206, controllers 202(2) and 202(3) located within home environment 206, geo-fence boundary 330, user 340(1) and controller 202(1) leaving the bounded region defined by geo-fence boundary 330, and accessory device 204(1) controlled by coordinator 210. In some embodiments, coordinator 210 can be configured to register each controller device configured to control aspects of home automation at home environment 206 (e.g., controllers 202(1)-202(3)) and a device profile for an accessory device (e.g., smart light, thermostat) to be controlled based on a location of the controller devices (and their corresponding users). Once registered, coordinator 210 can track a user state for each of the users, which may correspond to whether their corresponding controller device is at the specified location (e.g., within geo-fence boundary 330 or "home") or away from the specified location (e.g., not within geo-fence boundary 330 or "away"). Registering and tracking controller devices can help avoid the scenario described above where a triggered geo-fence causes a state change in one or more accessories regardless of whether other users are present at the home. For instance, in the example of FIG. 3C, controller 202(1) leaves the bounded region defined by geo-fence 330 and sends a boundary-crossing signal to coordinator 210. Instead of immediately switching an operational state of accessory 204(1), coordinator 210 can first check all current user states and update the presence state for home environment 206. When the presence state indicates that all users are "away," then the operational state change of accessory 204(1) may proceed (e.g., turn the lights off). However, the presence state, as depicted in FIG. 3C, shows that other users are "home" and the action (e.g., turning off accessory 204(1)) is ignored by coordinator 210, resulting in the lights staying on. In some cases, a time "buffer" can be used when boundary-crossing signals are received to ensure a stable home/away state. For example, coordinator 210 may wait 10 seconds (or other suitable time period) after receiving a boundary crossing signal from a controller device before implementing any geo-fence triggered automation processes, which may help avoid unnecessary changes to accessory device settings if a user is frequency entering and exiting the geo-fenced region (e.g., the user is walking through an adjacent neighborhood and inadvertently triggering "home" and "away" boundary crossing signals).

In some aspects, registration data (e.g., look up tables, lists, etc., for controllers and/or accessories) and presence data (e.g., state table) for a corresponding home environment may be stored in the resident coordinator, one or more controller devices, in a tertiary computing device (e.g., laptop or desktop computer, or other suitable data storage implementation), in the Cloud, or any combination thereof that is accessible by the resident controller, as would be understood by one of ordinary skill in the art. It should be understood that the simplified example shown in FIG. 3C is presented for the purpose of illustrating how user states and presence states can be used to provide a system to accommodate multiple users in a home automated system. Some embodiments may use more or fewer controllers, accessory devices, actions associated with the accessory devices, multiple geo-fences, different permissions associated with each controller (further discussed below), and the like. One of ordinary skill in the art would understand the many variations, modifications, and alternative embodiments thereof.

FIG. 3D shows a geo-fence-triggered home automation system 300(4) configured for multiple users with different permission settings, according to certain embodiments. In some embodiments, different users (and their corresponding controller devices) may have different permissions associated with one or more geo-fence triggered accessories in a smart home environment. For instance, a resident of home environment 206 may be granted access and control (e.g., privileges) over all accessories, while a worker or visitor (i.e., non-resident) may be granted limited control over a single accessory, as shown in FIG. 3D and further discussed below.

Home automation system 300(4) can include home environment 206, coordinator 210 stationed within home environment 206, user 340(1) and corresponding controller 202(1) entering geo-fenced area 330, user 340(2) and corresponding controller 202(2) entering geo-fenced area 330 (corresponding to user 340(2)), and accessory devices (1)-(5). As indicated above, some users can be granted control (e.g., editing permissions) and/or access (e.g., geo-triggered actions) to some or all accessories at a smart home environment. In some cases, notifications corresponding to a status of the accessories and/or location of other controllers are possible, and some users may be granted priority over others, particularly in automation conflicts between controller devices, as further discussed below. Referring to FIG. 3D, user 340(1) may be a resident of home environment 206 and by crossing geo-fence 330, may trigger any preferred number of accessories that may include turning on lights (e.g., accessory 204(1)), opening a garage door (e.g., accessory 204(2)), unlocking one or more door locks (e.g., accessory 204(3)), setting a new temperature on a thermostat (e.g., accessory 204(4)), or the like. The automation can be associated with controller 202(1) (user 340(1)) and operated by coordinator 210.

In contrast, user 340(2) may be a gardener (i.e., non-resident of home environment 206). When user 340(2) and corresponding controller 202(2) cross geo-fence 330, a boundary-crossing signal may be sent to coordinator 210 to unlock a side gate (e.g., accessory 204(5)). In some cases, access to accessory 204(5) may be further limited to a specific day (e.g., only on every other Monday) and/or a specific time of day (e.g., between the hours of 1 PM to 5 PM). Thus, the gardener is granted automatic access to the backyard, but cannot edit the access and control other parameters of home automation system 300(4). In this example, multiple users can still be managed via coordinator 210 by way of tracking user states and presence states, as further described below. Furthermore, different levels of permissions may create scenarios where certain accessories may change state in response to the boundary-crossing signal, despite their being other users (e.g., and controllers) being home. For instance, in the example of FIG. 3D, if user 340(1) leaves geo-fence boundary 330, accessories 204(1)-204(4) may still change state, because they may not affect the ability of user 340(2) to perform gardening services (e.g., the gardener does not need access to the inside of the home).

One of ordinary skill in the art would understand the many variations, modifications, and alternative embodiments thereof.

As noted above, different users may have different levels of permissions, which may affect which accessories are effected in response to a boundary-crossing signal, and what notifications, if any, are afforded the particular user in response to accessory state changes, user state changes, presence state changes, and the like.

FIG. 3E shows a geo-fence-triggered home automation system 300(5) configured for multiple users with different notification settings, according to certain embodiments. Home automation system 300(5) can include home environment 206, coordinator 210 stationed within home environment 206, user 340(1) and corresponding controller 202(1) entering geo-fenced area 330, user 340(2) and corresponding controller 202(2) entering geo-fenced area 330 (corresponding to user 340(2)), and various accessory devices. Setting different levels of notification access for different users can be useful for managing privacy. For example, user 340(1) can be a permanent resident (e.g., landlord) of home environment 206. As a landlord, she may not only want to know what accessories are affected, but also which other users are present in her home. Presence sharing settings can include "opting in" features that allow specific users to allow or disallow the sharing of their location data, including but not limited to their user state, whether they traverse geo-fence boundaries, whether the particular user interacts with various resident devices, such as lights and/or appliances (as opposed to the home automation system merely indicating that an undisclosed user turned on/off resident device), and the like. Referring to FIG. 3E, user 340(1) (via controller 202(1)) may be assigned permissions (e.g., via a controller registration user interface (UI)) such that she receives notifications when certain accessories change a state (e.g., thermostat changes set temperature) and when users traverse geo-fence 330 (e.g., controllers 202(3) and 202(4) are determined to be "home" because they located within geo-fence 330). In contrast, a tenant may be assigned to have more limited access to home automation data. Referring to FIG. 3E, user 340(2) (via controller 202(2)) may receive notifications for accessory state changes (e.g., including lights, locks, and thermostat), but may not receive information about the presence or absence of other controllers in the home environment. One of ordinary skill in the art would understand the many variations, modifications, and alternative embodiments thereof.

In some embodiments, "service groups" can be implemented in home environment 206 as a lookup table or other suitable database for controlling multiple accessories in response to a single trigger event (e.g., controller 202(1) entering/leaving geo-fenced area 330). Examples of service groups and implementations thereof are described in U.S. application Ser. No. 14/725,912, which is incorporated by reference in its entirety for all purposes.

In certain embodiments, automation can be controlled on a per-user level and per-home level of control, which may be referred to as "activation granularity." In per-user level activation, an automation can be triggered every time a user included in the automation arrives or leaves a corresponding geo-triggered boundary. In per-home level activation, the automation can be triggered on boundary changes, e.g., when the first of certain selected users arrives home or when the last of the selected users leaves home. Any number of users can be included in the "selected" group of users. In some cases, per-home and per-user level control can be operated simultaneously. For instance, one set of selected users can be assigned to per-user level activation controls and a second set of selected users can be assigned to per-home level user control. Furthermore, as indicated elsewhere, the boundary can be limited to a room, an area, multiple areas, a portion of property (e.g., a yard, a pool, a driveway), or any suitable area whether privately owned or not. One of ordinary skill in the art would understand the many variations, modifications, and alternative embodiments thereof.

FIG. 4 shows a table 400 listing options for defining action sets and triggers, according to certain embodiments. Column 402 lists examples of triggering events. As used herein, a triggering event can be any occurrence that is detectable by a controller (e.g., any of controllers 202 described above) or a coordinator (e.g., coordinator 210 described above). Column 402 lists categories of detectable triggering events. A "geofence" can be defined relative to the location of local environment 206, e.g., within half a mile, within 100 feet, etc. Controllers 202 (or other user devices) that have the ability to determine their location (e.g., using Global Positioning Service (GPS) receivers or the like) can detect when they enter or leave the geo-fence. In some embodiments, controller 202 can test for a triggering condition in response to detecting that it has entered or left the geofence; additionally or alternatively, controller 202 can report the event to coordinator 210, which can test for triggering conditions. In some cases, the triggering condition can be set to "always" or a subset thereof. For example, geofence 330 may trigger during certain times of the day, on weekdays, or other suitable criteria, as would be understood by one of ordinary skill in the art. The resulting action can be to change an accessory state, change multiple accessory states, send a notification, or any combination thereof. As noted above, an accessory can be referred to as an "accessory device" or "resident device." As indicated above, some embodiments may alternatively or additionally use signals other than geo-fence crossing signals to indicate when a user's mobile device has arrive or left a location (e.g., home), potentially in tandem to provide further accuracy and reliability. Other signals could be included if the user's device detects nearby accessories that are known to be at the home, or if an accessory in the location (e.g., home) recognizes a particular user (e.g., security camera). One of ordinary skill in the art would understand the many variations, modifications, and alternative embodiments thereof.

An accessory state change event can be detected when a controller or coordinator receives notification of the state change from the accessory. State-change notifications by an accessory to a controller can be implemented in a uniform accessory protocol, e.g., as described in above-referenced U.S. Provisional Application No. 61/935,967 and U.S. application Ser. No. 14/614,914. (It should be understood that since coordinator 210 can operate as a controller in relation to accessory 204, coordinator 210 can receive state-change notifications from accessories in the same manner as other controllers.)

A time/date event can be an event defined by reference to clocks and/or calendars. Examples of time/date events can include "daily at 10:00 pm," "Saturday at 8:00 am," and so on. Any controller or coordinator that has access to clock and/or calendar data to determine the current time and/or date can detect when a time/date event occurs.

A "weather" event can be tied to external conditions that may change daily. Examples of weather events include sunrise and sunset, which can happen at different times depending on the date and location. Other examples include an outside temperature exceeding or falling below a threshold, rain starting or stopping, barometric pressure changes, wind speed reaching a threshold value, ambient light levels above or below a threshold, seismic activity, or the like. A controller or coordinator can detect weather events using various techniques. For example, a controller or coordinator can periodically poll an online weather service or the like to retrieve weather data. Alternatively, weather sensors (e.g., thermometer, anemometer, barometer, light sensor) can be installed outside the home, and weather data can be retrieved from the sensors. Sunrise and sunset times, which are variable with location and date but much more predictable in their variations than most weather events, can be calculated based on the location of the home and the calendar date or obtained from an online service.

A "notification" event can include any type of electronic message signal that is generated at a source and receivable by a coordinator or controller, regardless of source. For instance, a coordinator or controller may be able to receive emergency broadcast messages (e.g., tornado warning, tsunami warning, seismic activity alerts). As another example, a coordinator may receive notifications from one of the controllers associated with the home (e.g., a notification that the schedule of the controller's user has changed); in some embodiments, such notifications can be generated by a controller that is temporarily absent from the local environment. As yet another example, a coordinator may receive notifications from a coordinator in a different local environment (e.g., a neighbor's home, assuming the neighbor has authorized the sharing of notifications); such a notification can include, e.g., weather-related information based on weather sensors the neighbor has installed, security information (such as detecting a possible break-in or suspicious activity), or the like.

Presence or absence of users can be determined using presence sensors in the home and/or by the presence or absence of particular user devices that each user generally carries on his or her person. For instance, coordinator 210 can detect which controllers 202 are present in local environment 206 and can infer presence or absence of the users of controllers 202 accordingly. Presence or absence of a user can be used to determine the "presence state" of a specific location, as further described at least with respect to FIGS. 6-7.

When a triggering event is detected, the controller or coordinator that detects the triggering event can test one or more triggering conditions associated with the triggering event. In some embodiments, a controller that detects a triggering event can report the event to the coordinator, and the coordinator can test the triggering condition(s). Column 404 lists categories of testable triggering conditions.

In some embodiments, the "always" condition indicates that resulting actions should be executed whenever the triggering event is detected. For instance, an action set defined with a manual triggering event can have the triggering condition defined as "always," with the result that the user can invoke the action set manually at any time. Triggering conditions based on time/date, weather conditions, and presence/absence of user(s) can be defined similarly to the corresponding categories of triggering events. Thus, for example, detection of a weather event can result in testing a time/date condition to determine whether to execute resulting actions Accessory state triggering conditions can be based on the current state of the accessory at the time of the triggering event. For example, in response to detecting a triggering event, a controller or coordinator that detects the triggering event can send a read request to a particular accessory to determine its state. Thus, for example, a triggering event can be a state change of one accessory (e.g., a front door changes from unlocked to lock state) and the triggering condition can be based on the state of another accessory (e.g., whether the garage door is locked).

Location conditions can be based on the location of the controller that detected the event and/or the location of another user (or the other user's device). For example, a triggering event might be sunset, and the triggering condition can be that the user is not at home; the resulting action can be to turn on a porch light.

Column 406 lists examples of categories of "resulting actions" that can be implemented in response to a triggering condition being satisfied. One category pertains to changing an accessory's state. For example, a controller or coordinator that detects a triggering event can test the triggering condition associated with the triggering event. If the condition is satisfied, the controller or coordinator can issue one or more write requests to one or more accessories to change their state. Thus, for example, an action set can be defined as: "When front door changes state from unlocked to locked (triggering event), check state of garage door; if garage door is not locked (triggering condition), then lock garage door." Detecting the state change of the front door can be based on a notification from the front-door accessory. Checking the state of the garage door can be done by sending a read request to the garage door accessory, and locking the garage door can be done by sending a write request to the garage door accessory. In another example, an action set can be defined as: "when a boundary crossing signal from geo-fence indicates that a mobile device is leaving the present location, check to see if the presence state indicates that no one else is home; if no one else is home (no mobile devices are detected in the home) then turn off all lights and turn on the security system to "away" mode; and if someone else is home, then do not change the current state of the lights or security system, but send a notification to user A indicating which user crossed the geo-fence boundary." One of ordinary skill in the art would understand the many variations, modifications, and alternative embodiments thereof.

Another category pertains to reading and reporting an accessory's state. For example, if a triggering condition is satisfied, the controller or coordinator can issue one or more read requests to one or more accessories to determine their state and can notify the user of the same (e.g., through a pop-up notification or push notification on the user's device). Thus, for example, assuming that a window in a home can be operated as an accessory, an action set can be defined as "When it starts raining (triggering event), determine whether the user is home; if the user is not home (triggering condition), read the state of the window and report the state to the user." The user then may be able to remotely close the window.

In some embodiments, the resulting actions can include actions other than interacting with an accessory. For instance, as described above, a controller can be implemented on a smart phone or other device that may support other functions in addition to communicating with accessories. In some embodiments, in response to detecting a triggering condition, the controller can invoke other functions of the device. For instance, the controller may invoke a messaging function of the device (e.g., email, SMS) to send a message to someone. The controller may also launch application programs on the device (e.g., a music playing program). Thus, for example, an action set can be defined as "When the user arrives home (triggering event), if a speaker system is not playing music (triggering condition), launch a music app and connect it to the speaker system (resulting action)." In another example, the action set may further be amended to "determine presence value of presence state for the home; if presence value indicates that someone else is home and the time is after 7 PM, do not launch music app and do not connect it to the speaker system in response to the user arriving home (triggering event)."

As these examples show, the general form of a triggered action set can be "When (triggering event) occurs, check (triggering condition); if (triggering condition) is true, then execute (resulting actions)." A user can define an action set by specifying the triggering event, triggering condition, and resulting action from the categories of table 400 or other categories as desired. In various embodiments, the triggering events and/or triggering conditions can be defined with any degree of complexity (e.g., "If it is after dark and not a Tuesday and no users are home, then . . . "). Any number of resulting actions can be triggered by the same triggering event and/or triggering condition.

FIG. 5 is a table 500 that provides an access list for an environment model, according to certain embodiments. For instance, table 500 may be accessible by coordinator 210 to determine a permission level for different users. For purposes of illustration, it is assumed that table 500 is associated with home environment 206 of FIGS. 2 and 3C and that the home thus modeled is the residence of four individuals: "Mom," "Dad," "Jill," and "Jack." It is assumed that Mom and Dad are adults, while Jill and Jack are minor children. It is also assumed that others may sometimes need access to home environment model 300. For example, "Sitter" can be a person hired to watch the children while the adults are away. For each person (user) with access to the environment, table 500 can list a user identifier (field 502), controller devices belonging to that user (field 504), and permissions granted to that user (field 506). As shown, a user can have any number of devices. (Dad has five, Mom and Jill each have two, Jack and Sitter each have one.) In this example, permissions can be granted per user rather than just per device, so that a user's experience can be consistent across devices. Per-device permissions can also be implemented if desired, and a combination of per-user and per-device permissions can be supported. For example, a user with full access permissions (e.g., Dad in FIG. 5) may have a device that is shared with other users, such as a set-top box for a TV (which might be used by the entire family), and Dad may not want other users to have full access to the environment model when they use the set-top box. Accordingly, as shown in FIG. 5, the set-top box can have different permissions from Dad's other devices.

As shown in table 500, each user can be assigned a permission level. In this example, three permission levels are defined. A user with "full" permission can control accessories in environment model 300, modify environment model 300(3), and add or remove users from access table 500. A user with "home" permission can control accessories in environment model 300 and modify environment model 300, but cannot add or remove users. A user with "basic" permission can control accessories in environment model 300 but cannot change the model or add or remove users.

A user with "guest" permission can have more restricted access. For example, guest permissions can set limits as to which accessories can be controlled, when the accessories can be controlled, etc., and different levels of "guest" permission can be defined with different combinations of limits on access. Thus, for example, user Sitter may have access to all accessories but only during hours when Sitter is expected to be watching the children. Another user, such as a gardener, might have access only to accessories in an outside area (e.g., side gate—accessory 204(5)) allowing the gardener access to the backyard, gardening tools kept in the garage, and to the sprinkler systems, but not to the interior of the house. Guest permissions or other forms of restricted access can support fine-grained control of access to accessories in environment model 300. Restrictions can be based on specific accessories; rooms; time constraints (e.g., specific hours during the day, days of a week, or a date range); usage constraints (e.g., a limit on the number of hours the user can operate the TV per day or per week); whether the controller attempting access is in the local environment or remote from it; and so on. One of ordinary skill in the art would understand the many variations, modifications, and alternative embodiments thereof.

In some embodiments where users control accessories by interacting with a coordinator (e.g., coordinator 210 of FIG. 2), coordinator 210 can consult table 500 to determine whether a user has permission to perform a requested operation (e.g., controlling a particular accessory) and can communicate control messages to the accessory only if the user has permission. Where interaction with accessories in environment 300 is mediated through coordinator 210, it is assumed that coordinator 210 has privilege to control all accessories in environment 300, and the accessory might or might not know which controller was the ultimate source of a control message received from coordinator 210.

In some embodiments, permissions may also correspond to notifications. A user with "full" permissions may receive notifications for every aspect of automation in home environment 206. Users with "basic" or "home" privileges may only receive a subset of notifications, as defined by those with full privileges. Users with "guest" may not receive any notification, or notification pertaining only to their limited set of privileges (e.g., gardener receives indication that the side gate and shed is unlocked in response to him crossing geo-fence 330). One of ordinary skill in the art would understand the many variations, modifications, and alternative embodiments thereof.

As described above, one aspect of the present technology is the gathering and use of data available from various sources to improve user location accuracy. The present disclosure contemplates that in some instances, this gathered data may include personal information data that uniquely identifies a specific person. Such personal information data can include location-based data, or other identifying information such as telephone numbers, email addresses, work addresses, home addresses, past interaction records, or the like.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, users can select to not provide precise location information, but permit the transfer of location zone information. One of ordinary skill in the art would understand the many variations, modifications, and alternative embodiments thereof.

FIG. 6 shows aspects of a user state table 600 and presence state table 610, according to certain embodiments. A user state table can be used to track whether a particular user is home (e.g., determined to be at or near a home environment, which may be defined by a geo-fence) or away (e.g., outside of a defined boundary, such as a geo-fence). A presence state table can be used to track a user presence at a smart home environment, which can help avoid unintended functions when multiple users are frequently coming and going from the home. For example, as described above with respect to FIG. 3B, a first user may trigger a geo-fence event when leaving the home, which may cause some of the lights to shut off while other users are still present at the home. By tracking the location of each user in the home, certain actions (e.g., turning off the lights, setting a new temperature, etc.) can be executed or ignored based on the presence state (represented by the presence value) to avoid unintended consequences of automated functions. In some embodiments, the presence state can be tracked, managed, and updated via coordinator 210, one or more controllers, a tertiary class of computing device (e.g., Cloud-based database), or a combination thereof.

Referring to table 600, four users reside at home environment 206, with each having a corresponding "user state." User 1 and User 4 are determined to be home, while User 2 and User 3 are determined to be away. Some users may be classified as a "primary" user. A "primary user" can be a user will full permissions or, in some cases, lesser permissions. There can be multiple "primary" users. In some cases, there may be no designated "primary" users. For instance, the concept of primary and non-primary users may be satisfactorily defined by permission levels, as further described above with respect to FIG. 5. The user states can be updated in real-time or at any suitable frequency (e.g., every 10 seconds). In some cases, the user states can be updated based on certain triggers. For instance, when coordinator 210 receives a boundary crossing signal (e.g., in response to user 1 crossing geo-fence 330 to come home), the corresponding user state (User 1) can be updated to be "home." Alternatively or additionally, a user state can be determine directly or indirectly based on certain interactions. For example, if user 1 interfaces with a smart-enabled television (e.g., a television that can be monitored and controlled by coordinator 210), then it can be inferred that user 1 is probably home despite the fact that the geo-fence was not recently triggered by user 1. In another example, a user can be defaulted to "away" if no geo-triggers or any interaction with any accessories (e.g., sound system, television, smart lights, etc.) are detected for a period of time (e.g., 1 week). One of ordinary skill in the art would understand the many variations, modifications, and alternative ways of detecting and assigning a user state.

Referring to table 610, four presence states and corresponding presence values are also defined based on the individual user states. At a presence value of "0," every user is determined to be home. At a presence value of "1," some users are determined to be home (but not all users), including the primary user. At a presence value of "2," some users are home (not all users), but not including the primary user. At a presence value of "3," nobody is determined to be home. Referencing FIG. 3C, and assuming that each user can be inferred by their corresponding mobile device, controller 202(1) (i.e., user 340(1)) may be determined to have a user state of "away" as she crosses geo-fence 330, and controllers 202(2) and 202(3) (corresponding to users 340(2) and 340(3)) may be determined to have a user state of "home." When user 340(1) crosses geo-fence 330, an action to turn off lights (accessory device) 204(1) may be prompted. Prior to triggering the action, coordinator 210 can first reference table 600 to update each user state (if not up to date), determine the current presence state/value of home environment 206, and determine if the prompted action should be carried out. Since the presence state may be either "some users are home including primary" or "some users are home—not primary," then the lights are not turned off. Any of the myriad triggering events, triggering conditions, resulting actions, etc., discussed throughout this disclosure can be modified based on the user state and presence state/value, as would be understood by one of ordinary skill in the art with the benefit of this disclosure. That is, one of ordinary skill in the art would understand the many variations, modifications, and alternative embodiments thereof.

Figure 7:
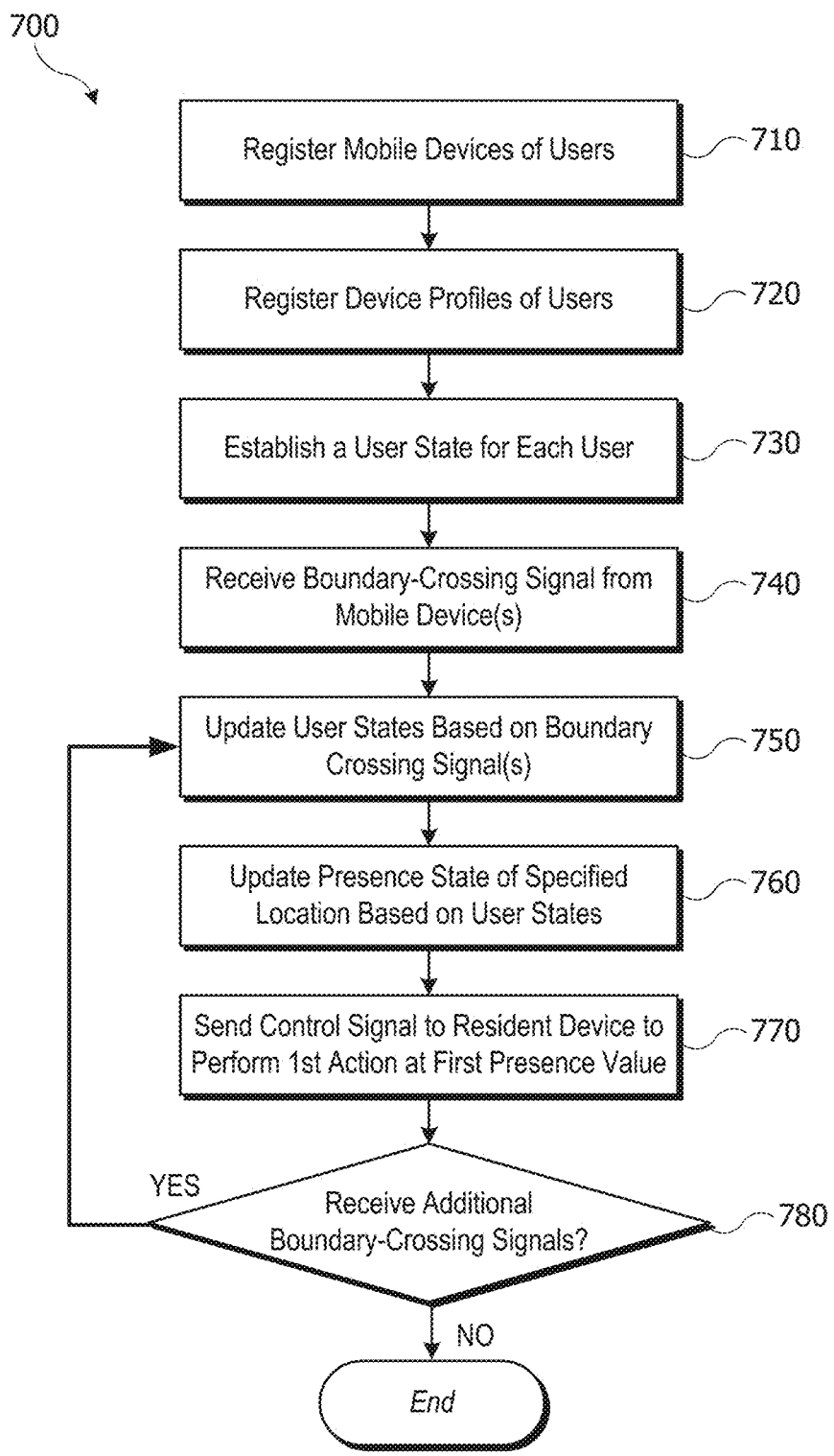
FIG. 7 shows a simplified method for presence triggered notifications and actions at a specified location, according to certain embodiments.

FIG. 7 shows a simplified method 700 for presence triggered notifications and actions within a location, according to certain embodiments. Method 700 can be performed by processing logic that may comprise hardware (circuitry, dedicated logic, etc.), software operating on appropriate hardware (such as a general purpose computing system or a dedicated machine), firmware (embedded software, computer-program product), or any combination thereof. To provide a non-limiting point of reference for the reader, the steps of method 700 are described with respect to the embodiments presented in FIG. 2 and FIG. 3C-3E. In certain embodiments, method 700 can be performed at least by a coordinator device (e.g., resident controller), as described above with respect to FIGS. 2, 3C-3E, and FIG. 8.

At step 710, method 700 can include registering a plurality of mobile devices of a plurality of users, according to certain embodiments. The registering can be performed and/or maintained by coordinator 210, or other suitable controller. A mobile device, or a "controller," as described above, can include any suitable mobile electronic device that can be used in the manner described in the various embodiments herein (e.g., FIGS. 3C-3E). For instance, a controller can be implemented, for example, on a general purpose computing device such as a desktop computer, laptop computer, tablet computer, smart phone, other mobile phone, other handheld or wearable computing device (e.g., smart watch or smart eyewear), or the like, by providing the general purpose computing device with appropriate executable program code; alternatively, a controller can be a special purpose computing device. A resident controller or "coordinator" can be any suitable controller device, as further described above with respect to FIG. 2. In some cases, multiple mobile devices may be registered to a single user and multiple users may be registered to a single mobile device. In certain implementations, different types of permissions may be associated with the mobile device and/or corresponding user, as further described above with respect to FIG. 5.

At step 720, method 700 can include registering a device profile for a resident device to be controlled based on a location of the plurality of users, according to certain embodiments. The resident device can be communicably coupled with the resident controller (coordinator) that is within the location. A device profile can indicate how a resident device (accessory device) operates. For instance, a device profile may indicate how the accessory responds to particular events, including geo-fence crossings and/or time/date settings, what action the accessory device will perform in response to the event (e.g., toggle between locking and unlocking doors, begin recording on a security camera, change a temperature setting based on a time of day or the presence state of the home, etc.), user permissions for accessing the accessory, and the like, as further described above with respect to FIG. 5. In some cases, multiple actions may be performed in response to a single event. One of ordinary skill in the art would understand the many variations, modifications, and alternative embodiments thereof.

Resident devices may include any suitable accessory device including smart lights, locks, security devices, appliances, HVAC controls, smart blinds, irrigation systems, or any other remotely controllable device that is operable within the location (e.g., home environment 206). In some cases, different accessories may be available to different users. For instance, a landlord may have access to automated HVAC accessories (e.g., thermostat), while tenants may not. Similarly, different actions may be available to different users. For instance, security video may be available to a resident landlord and tenant, but the landlord may have additional access to stored video archives. One of ordinary skill in the art would understand the many variations, modifications, and alternative embodiments thereof.

At step 730, method 700 can include establishing a user state for each of the plurality of users, where the user state can specify whether the user is at the specified location, according to certain embodiments. A user state within the location can simply indicate whether a user is "home" (at the specified location) or "away" (not at the specified location). The specified location can be a home, a portion of a home (e.g., a room, backyard, kitchen, etc.), an area defined by one or more geo-fenced areas (e.g., geo-fence 330), or the like. The specified area may include multiple contiguous or non-contiguous areas, or the like. In some cases, the specified area may be an area defined by one or more geo-fence regions. A user state database (e.g., state table) can be managed (e.g., accessed, stored, edited, etc.) via a resident controller (coordinator 210) and updated in real-time (e.g., update at every geo-fence crossing), or at any suitable interval of time.

At step 740, method 700 can include receiving boundary-crossing (geo-fence) signals from the plurality of mobile devices, where a boundary-crossing signal specifies when one of the mobile device crosses a boundary (e.g., the geo-fence) around the location. As indicated above, multiple geo-fences can be defined, tracked, and incorporated into home environment 206. For example, a first geo-fence may be placed in the backyard such that if any user is determined to be in the backyard (e.g., by a geo-fence crossing, by motion detection, etc.), then an automated sprinkler system will not turn on. Continuing the example, a second geo-fence, such as geo-fence 330, may inform coordinator 210 that a user has left the home and can cause the lights and HVAC to change states, provided that no other users are home (based on the current presence state).

At step 750, method 700 can include updating the user states based on at least the boundary-crossing signals, according to certain embodiments. As indicated above, the user state can define whether the user is at the location. This may be detected by geo-fence crossings (e.g., detecting when a controller device crosses a geo-fence), by inferring a presence based on certain local actions performed by controllers (e.g., controlling a thermostat in home environment 206 via a short-range communication protocol), or other direct or indirect ways of confirm the presence or absence of a user (via their corresponding controller). One of ordinary skill in the art would understand the many variations, modifications, and alternative embodiments thereof.

At step 760, method 700 can include updating a presence state of the location based on changes to the user states, where the device profile specifies a first action to be performed when the presence state transitions to a first presence value, according to certain embodiments. The presence state can include tracking how many of the users (i.e., their corresponding mobile devices) are currently at the location. For instance, the presence state may indicate a first presence value (e.g., no users are present), a second presence value (e.g., all three users are present), a third presence value (e.g., 1 of 3 uses are present) or the like. As indicated above, an action can include how a corresponding accessory device will respond to an event. Some non-limiting examples include setting a first temperature on a thermostat if no one is home (e.g., a first presence value), setting a second temperature if at least one user is home (e.g., the second or third presence value), turning off certain lights if no one is home, switching a security system to an "away" mode when no one is home, switching the security system to "home" mode when one or more users are determined to be at home and it is evening time, etc. In some cases, an action can also include sending notifications to certain mobile devices (e.g., controller 220(1) and 220(2)) that may correspond to a current presence state, changes to the presence state, changes to an operational state of one or more accessories, etc. Presence values can be defined in any suitable way. The examples described herein include first, second, and third presence values that correspond to a specific number of users that are at the locations. Other embodiments may further include aspects of time (how long have users been at the location, what time of the day is it, etc.) or other suitable metric. One of ordinary skill in the art would understand the many variations, modifications, and alternative embodiments thereof.

At step 770, method 700 can include sending a control signal to the resident device to perform the first action when the presence state changes to the first presence value, according to certain embodiments. That is, once a trigger is received (e.g., geo-fence is crossed) and coordinator 210 determines which accessories are affected (e.g., which may be based on which user crossed the geo-fence, which permissions they have, etc.) and what is the current presence state within the location (e.g., the presence value indicates that no one is home), the coordinator can then implement the first action. Examples of this process are described above at least with respect to FIGS. 3C-3E. At step 780, if additional boundary crossing signals are received by coordinator 210, method 700 proceeds to step 750 to update the user states based on the boundary crossing signals. In the case where no additional boundary crossing signals are received, method 700 ends.

It should be appreciated that the specific steps illustrated in FIG. 7 provide a particular method 700 for presence triggered actions and notifications at a location, according to certain embodiments. Other sequences of steps may also be performed according to alternative embodiments. For example, alternative embodiments may perform the steps outlined above in a different order. Moreover, the individual steps illustrated in FIG. 7 may include multiple sub-steps that may be performed in various sequences as appropriate to the individual step.

Additional steps may be added or removed depending on the particular applications, and different methods of implementing various automations can be utilized. For example, geo-fence crossing may not be the only trigger for activity. Other triggers can include a time of day, day of the week, a condition of a resident device (e.g., what is the current temperature), etc. By way of example, if a temperature rises above a threshold value, an automation may be triggered to turn on an air conditioner to cool the home to a lower target temperature, but only if one or more users are home (as represented by the corresponding presence value). Furthermore, some automations may be implemented by a condition of the presence state, rather than a change. Many of the examples above describe how an event causes a change in a presence state, thereby causing an action to occur. In contrast, a user may set their lights to turn on 30 minutes before sunset, but only if no one is home. In this example, no change in the presence state triggered an action; rather, an action that was preset to occur (turn on the lights) only occurred based on a condition of the presence state, which may not have changed for some time. In another example, a motion sensor may be configured to send a notification to a particular user (e.g., the landlord) when it detects motion, but only if none of the approved users are currently home (i.e., the presence state indicates that no users are within a specified location). Some automations may be based on a presence state, but may depend on other factors beyond the particular set of users. For example, some residents may not be "users" (e.g., guests). In such cases, an automation may be set to turn off the lights when all of the users are not within a location and no other sensors or accessories (e.g., motion sensors, security cameras, appliances, etc.) indicate that a person (e.g., the guest) is present in the home. One of ordinary skill in the art would recognize and appreciate many variations, modifications, and alternatives of the method 700.

Example User Interface

Any of the controller devices and coordinator device described above can provide a user interface to facilitate user access to the automated environment, including control of accessory devices, notifications, and configuration of the home environment, as described above. An example of a graphical user interface will now be described. It is to be understood that other user interfaces can also be substituted.

Figure 10:
FIG. 10 shows an example user interface screen, according to certain embodiments.

FIG. 10 show an example user interface screens 1000(1)-1000 (4), according to certain embodiments. Like all user interface screens described herein, screens 1000 can be presented on a display of a controller device. In some embodiments, a user interface screen (including screens 1000(1)-1000(4) and other screens described herein) can occupy the entire display area (e.g., on a mobile phone or other device with a relatively small display); in other embodiments, a user interface screen can occupy a portion of the display area (e.g., a window or pane on a virtual desktop displayed on a desktop or laptop computer). The user interface can incorporate various graphical control elements that the user can select in order to invoke functionality of the application program that generates the interface screens. For example, if the user interface is presented on a touchscreen display, the user can touch a control element to select it; if the user interface is presented on a display that is not a touchscreen, the user can operate a pointing device (e.g., mouse, trackpad, etc.) to position a cursor over a control element, then select the control element by tapping or clicking. Other input techniques can also be used (e.g., mapping keys on a keyboard to control elements, voice input, etc.).

User interface screen 1000(1) can be a starting screen displayed when the user first wants to create a new automation in the automation application program (also referred as an "app") to configure an environment model and control an automated environment using the environment model. In the examples herein, the automated environment is assumed to be a home, but it is to be understood that other automated environments can be configured and controlled using similar interfaces. Referring to screen 1000(1), a user is given the option to set an automation based on when certain people arrive home, when certain people leave the home, and a time of day. Other criteria (e.g., day of the week, a "condition"-based presence state, etc., as further described above) can be used. Screen 1000(1) also provides options to provide how certain accessories (i.e., resident devices) are controlled and what to do if a sensor (e.g., motion sensor, door sensor, audio sensor, etc.) detects something, which can include changing a state of one or more resident devices, sending one or more notifications to particular users, or a combination thereof.

User interfaced screen 1000(2) shows an example of various options available when the "time of day occurs" option is selected in screen 1000(1). The user can select the time of day (e.g., sunrise, 30 minutes before sunset, a particular time of day, etc.), how often to repeat the automation (e.g., which days of the week), and how to "restrict" the location, which may correspond to the presence value as described above. Referring to screen 1000(2), the user selects "only when somebody is home," thereby requiring that the automation can be triggered based on the set time, but only is set when a user is home, and further sets the automation to occur "30 minutes before sunset." Other selections include "only when I am home," which can correspond to a user with full privileges (or any suitable level of privileges); "only when nobody is home," which can correspond to when no identified users are home (e.g., users with registered mobile devices) or when no people are detected (e.g., both registered and unregistered, such as guests); "only when I am not home," which can correspond to a person with a particular set of privileges is not home; or "any location," which may correspond to no presence restriction (e.g., users can be any location—either home or away). Screen 1000(2) provides one particular set of configurable options and it should be appreciated that any of the options described above or within the purview of the spirit and scope of the present disclosure can be included.

User interface screen 1000(3) provides an interface to control and select any of a number of controllable resident devices, which can include living room devices (e.g., front door), porch devices (e.g., air system, lights, locks, etc.), entryway devices (e.g., locks, lights), bedroom devices (e.g., bedroom air control systems, bedroom desk lights, bedroom humidity, bedroom lamps, and temperature), kitchen devices (e.g., lights, motion detection, nigh lights, etc.), and the like. Referring specifically to interface screen 1000(3), the user has set the bedroom desk light, bedroom lamp, entryway light, kitchen light, and kitchen night light to turn on 30 minutes before sunset, which was set in the previous interface screen 1000(2). User interface 1000(4) displays a summary of the newly defined automation, which includes turning on the selected resident devices (e.g., accessories) depicted on interface screen 1000(3) 30 minutes before sunset only when someone is home. It should be understood that the example provided above is non-limiting and other user interfaces, content of the user interface, controllable aspects of the user interface, etc., are possible. One of ordinary skill in the art would understand the many variations, modifications, and alternative embodiments thereof.

Example System Diagram for a Controller and Device

Embodiments described herein can be implemented in electronic devices that can be of generally conventional design. Such devices can be adapted to conform to a uniform accessory protocol that supports command-and-control operations by which a controller (a first electronic device) can control operation of an accessory (a second electronic device). In some instances, a device can combine features or aspects of a controller and an accessory, e.g., in the case of a coordinator or proxy as described above.

Figure 8:
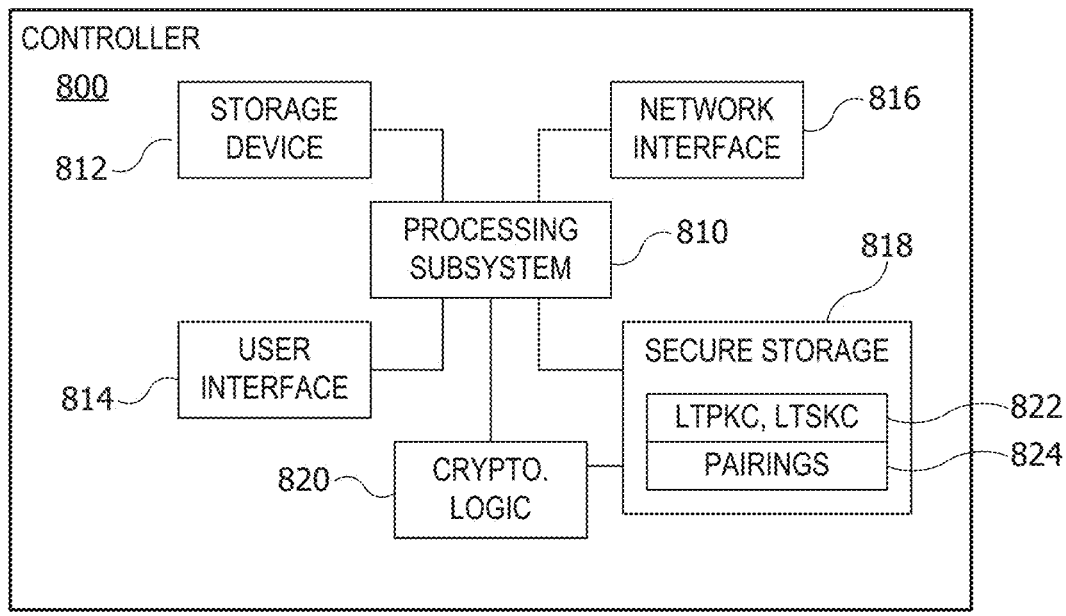
FIG. 8 is a simplified block diagram of a controller, according to an embodiment embodiments.

FIG. 8 is a simplified block diagram of a controller 800 according to an embodiment of the present invention. Controller 800 can implement any or all of the coordinator and controller functions, behaviors, and capabilities described herein, as well as other functions, behaviors, and capabilities not expressly described. Controller 800 can include processing subsystem 810, storage device 812, user interface 814, communication interface 816, secure storage module 818, and cryptographic logic module 820. Controller 800 can also include other components (not explicitly shown) such as a battery, power controllers, a GPS tracking system, and other components operable to provide various enhanced capabilities. In various embodiments, controller 800 can be implemented in a desktop computer, laptop computer, tablet computer, smart phone, other mobile phone, wearable computing device, or other systems having any desired form factor. Further, as noted above, controller 800 can be implemented partly in a base station and partly in a mobile unit that communicates with the base station and provides a user interface.

Storage device 812 can be implemented, e.g., using disk, flash memory, or any other non-transitory storage medium, or a combination of media, and can include volatile and/or non-volatile media. In some embodiments, storage device 812 can store one or more application and/or operating system programs to be executed by processing subsystem 810, including programs to implement various operations described above as being performed by a coordinator (e.g., method 700). For example, storage device 812 can store a uniform controller application that can read an accessory description record and generate a graphical user interface for controlling the accessory based on information therein (e.g., as described in above-referenced U.S. Provisional Application No. 61/935,967 and U.S. application Ser. No. 14/614,914). In some embodiments, portions (or all) of the controller/coordinator functionality described herein can be implemented in operating system programs rather than applications ("apps"). In some embodiments, storage device 812 can also store apps designed for specific accessories or specific categories of accessories (e.g., an IP camera app to manage an IP camera accessory or a security app to interact with door lock accessories).

User interface 814 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 814 to invoke the functionality of controller 800 and can view and/or hear output from controller 800 via output devices of user interface 814.

Processing subsystem 810 can be implemented as one or more integrated circuits, e.g., one or more single-core or multi-core microprocessors or microcontrollers, examples of which are known in the art. In operation, processing system 810 can control the operation of controller 800. In various embodiments, processing subsystem 810 can execute a variety of programs in response to program code and can maintain multiple concurrently executing programs or processes. At any given time, some or all of the program code to be executed can be resident in processing subsystem 810 and/or in storage media such as storage device 812.

Through suitable programming, processing subsystem 810 can provide various functionality for controller 800. For example, in some embodiments, processing subsystem 810 can implement various processes (or portions thereof) described above as being implemented by a controller. Processing subsystem 810 can also execute other programs to control other functions of controller 800, including application programs that may be stored in storage device 812. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above.

Communication interface 816 can provide voice and/or data communication capability for controller 800. In some embodiments communication interface 816 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 816 can provide wired network connectivity (e.g., Ethernet) in addition to or instead of a wireless interface. Communication interface 816 can be implemented using a combination of hardware (e.g., driver circuits, antennas, modulators/demodulators, encoders/decoders, and other analog and/or digital signal processing circuits) and software components. In some embodiments, communication interface 816 can support multiple communication channels concurrently or at different times, using the same transport or different transports.

Secure storage module 818 can be an integrated circuit or the like that can securely store cryptographic information for controller 800. Examples of information that can be stored within secure storage module 818 include the controller's long-term public and secret keys 822 (LTPKC, LTSKC), and a list of paired accessories 824 (e.g., a lookup table that maps accessory ID to accessory long-term public key LTPKA for accessories that have completed a pair setup or pair add process as described above).

In some embodiments, cryptographic operations can be implemented in a cryptographic logic module 820 that communicates with secure storage module 818. Physically, cryptographic logic module 820 can be implemented in the same integrated circuit with secure storage module 818 or a different integrated circuit (e.g., a processor in processing subsystem 810) as desired. Cryptographic logic module 820 can include various logic circuits (fixed or programmable as desired) that implement or support cryptographic operations of controller 800, including any or all cryptographic operations described above. Secure storage module 818 and/or cryptographic logic module 820 can appear as a "black box"

to the rest of controller 800. Thus, for instance, communication interface 816 can receive a message in encrypted form that it cannot decrypt and can simply deliver the message to processing subsystem 810. Processing subsystem 810 may also be unable to decrypt the message, but it can recognize the message as encrypted and deliver it to cryptographic logic module 820. Cryptographic logic module 820 can decrypt the message (e.g., using information extracted from secure storage module 818) and determine what information to return to processing subsystem 810. As a result, certain information can be available only within secure storage module 818 and cryptographic logic module 820. If secure storage module 818 and cryptographic logic module 820 are implemented on a single integrated circuit that executes code only from an internal secure repository, this can make extraction of the information extremely difficult, which can provide a high degree of security. Other implementations are also possible.

Figure 9:
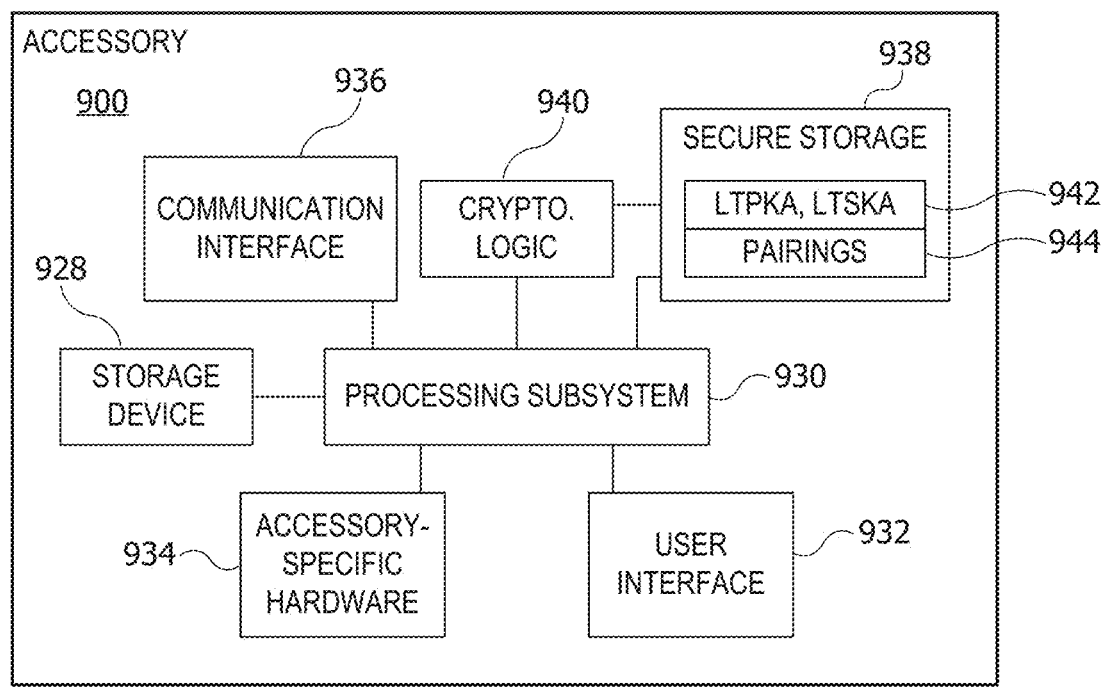
FIG. 9 is a simplified block diagram of an accessory according, according to certain embodiments.

FIG. 9 is a simplified block diagram of an accessory device 900, according to certain embodiments. Accessory device 900 can implement any or all of the accessory functions, behaviors, and capabilities described herein, as well as other functions, behaviors, and capabilities not expressly described. Accessory 900 can include storage device 928, processing subsystem 930, user interface 932, accessory-specific hardware 934, communication interface 936, secure storage module 938, and cryptographic logic module 940. Accessory 900 can also include other components (not explicitly shown) such as a battery, power controllers, and other components operable to provide various enhanced capabilities.

Accessory 900 is representative of a broad class of accessories that can be operated by a controller such as controller 800, and such accessories can vary widely in capability, complexity, and form factor. Various accessories may include components not explicitly shown in FIG. 9, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 928 can be implemented, e.g., using disk, flash memory, or any other non-transitory storage medium, or a combination of media, and can include volatile and/or non-volatile media. In some embodiments, storage device 928 can store one or more programs (e.g., firmware) to be executed by processing subsystem 930, including programs to implement various operations described above as being performed by an accessory, as well as operations related to particular accessory behaviors. Storage device 928 can also store an accessory object or accessory definition record that can be furnished to controller devices, e.g., during device discovery as described in above-referenced U.S. Provisional Application No. 61/935,967. Storage device 928 can also store accessory state information and any other data that may be used during operation of accessory 900.

Processing subsystem 930 can include, e.g., one or more single-core or multi-core microprocessors and/or microcontrollers executing program code to perform various functions associated with accessory 900. For example, processing subsystem 930 can implement various processes (or portions thereof) described above as being implemented by an accessory, e.g., by executing program code stored in storage device 928. Processing subsystem 930 can also execute other programs to control other functions of accessory 930. In some instances programs executed by processing subsystem 930 can interact with a controller (e.g., controller 800), e.g., by generating messages to be sent to the controller and/or receiving messages from the controller.

User interface 932 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 900, a user can operate input devices of user interface 932 to invoke functionality of accessory 900 and can view and/or hear output from accessory 900 via output devices of user interface 932. Some accessories may provide a minimal user interface or no user interface. at all. Where the accessory does not have a user interface, a user can still interact with the accessory using a controller (e.g., controller 800).

Accessory-specific hardware 934 can include any other components that may be present in accessory 900 to enable its functionality. For example, in various embodiments accessory-specific hardware 934 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of accessory functionality can be supported by providing appropriate accessory-specific hardware 934 and that accessory-specific hardware can include mechanical as well as electrical or electronic components.

Communication interface 936 can provide voice and/or data communication capability for accessory 900. In some embodiments communication interface 936 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 936 can provide wired network connectivity (e.g., Ethernet) in addition to or instead of a wireless interface. Communication interface 936 can be implemented using a combination of hardware (e.g., driver circuits, antennas, modulators/demodulators, encoders/decoders, and other analog and/or digital signal processing circuits) and software components. In some embodiments, communication interface 936 can support multiple communication channels concurrently or at different times, using the same transport or different transports.

Secure storage module 938 can be an integrated circuit or the like that can securely store cryptographic information for accessory 900. Examples of information that can be stored within secure storage module 938 include the accessory's long-term public and secret keys 942 (LTPKA, LTSKA as described above), and a list of paired controllers 944 (e.g., a lookup table that maps controller ID to controller long-term public key LTPKC for controllers that have completed a pair setup or pair add process as described above). In some embodiments, secure storage module 938 can be omitted; keys and lists of paired controllers can be stored in storage device 928.

In some embodiments, cryptographic operations can be implemented in a cryptographic logic module 940 that communicates with secure storage module 938. Physically, cryptographic logic module 940 can be implemented in the same integrated circuit with secure storage module 938 or a different integrated circuit (e.g., a processor in processing subsystem 930) as desired. Cryptographic logic module 940 can include various logic circuits (fixed or programmable as desired) that implement or support cryptographic operations of accessory 900, including any or all cryptographic operations described above. Secure storage module 938 and/or cryptographic logic module 940 can appear as a "black box" to the rest of accessory 900. Thus, for instance, communication interface 936 can receive a message in encrypted form that it cannot decrypt and can simply deliver the message to processing subsystem 930. Processing subsystem 930 may also be unable to decrypt the message, but it can recognize the message as encrypted and deliver it to cryptographic logic module 940. Cryptographic logic module 940 can decrypt the message (e.g., using information extracted from secure storage module 938) and determine what information to return to processing subsystem 930. As a result, certain information can be available only within secure storage module 938 and cryptographic logic module 940. If secure storage module 938 and cryptographic logic module 940 are implemented on a single integrated circuit that executes code only from an internal secure repository, this can make extraction of the information extremely difficult, which can provide a high degree of security. Other implementations are also possible.

Accessory 900 can be any electronic apparatus that interacts with controller 800. In some embodiments, controller 800 can provide remote control over operations of accessory 900 as described above. For example controller 800 can provide a remote user interface for accessory 900 that can include both input and output controls (e.g., a display screen to display current status information obtained from accessory 900 and an input control such as a touchscreen overlay to allow changes to the status information). Controller 800 in various embodiments can control any function of accessory 900 and can also receive data from accessory 900.

It will be appreciated that the system configurations and components described herein are illustrative and that variations and modifications are possible. It is to be understood that an implementation of controller 800 can perform all operations described above as being performed by a controller and that an implementation of accessory 900 can perform any or all operations described above as being performed by an accessory. A proxy, bridge, tunnel, or coordinator can combine components of controller 800 and accessory 900, using the same hardware or different hardware as desired. The controller and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Further, where proxies or controllers are present, it can be but need not be the case that all controllers are permitted to access all accessories via the proxy or controller. Some controllers might be restricted from accessing accessories when not within the local environment, and some accessories might require that controllers access them directly rather than through a proxy or coordinator. This may be defined in the permissions, as described above at least with respect to FIG. 5.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method of controlling devices at a specified location, the method comprising performing, by a resident controller:

registering a plurality of mobile devices of a plurality of users to receive location information of the plurality of mobile devices for determining a user location of one or more of the plurality of users;

registering a device profile for a resident device of a plurality of resident devices to be controlled based at least in part on the user location of the one or more of the plurality of users, the resident device within the specified location and communicably coupled with the resident controller;

generating an interface having a plurality of graphical control elements corresponding to the plurality of resident devices, the plurality of graphical control elements selectable by a user to configure an environment model and program an automated environment using the environment model, wherein at least one of the plurality of graphical control elements specify the user location of the one or more of the plurality of users corresponding to a user state, wherein the environment model specifies access of the plurality of mobile devices and actions of the plurality of resident devices;

establishing the user state for each of the plurality of users based on the location information obtained from the plurality of mobile devices, wherein each user state specifies whether a corresponding user is within the specified location;

updating a presence state of the specified location based on changes to the user state of the plurality of users, wherein the device profile specifies a first action to be performed when the presence state of the specified location transitions to a first presence value; and in response to the presence state changing to the first presence value, sending a control signal to the resident device to perform the first action in accordance with the environment model.

2. The method of claim 1, further comprising:

receiving a boundary-crossing signal from at least one of the plurality of mobile devices, wherein a boundary-crossing signal specifies when one of the plurality of mobile devices crosses a boundary around the specified location;

updating the user state based on the boundary-crossing signal; and updating the presence state of the location based on updated changes to the user state.

3. The method of claim 1, wherein the first presence value is that the user state of all of the plurality of users indicate presence within the specified location.

4. The method of claim 1, wherein each user corresponds to one mobile device.

5. The method of claim 1, wherein the resident controller comprises a device located within the specified location.

6. The method of claim 1, wherein the first action corresponds to:

performing an automation of the resident device at the specified location; or sending a notification to one or more of the mobile devices, the notification corresponding to the presence state or a status of the resident device.

7. The method of claim 1, wherein the first action is based at least in part on the first presence value and at least one or more of a time of day, day of week, or an event from a resident device.

8. The method of claim 1, further comprising:

providing a user interface to allow the one or more of the plurality of users to define the first action, the first action comprising changing an operational state of the resident device.

9. The method of claim 1, further comprising:

receiving at least one of geo-fence data, user location-triangulation data, or user micro-location data; and updating the user state based on the geo-fence data, user location-triangulation data, or user micro-location data.

10. The method of claim 1, wherein the one or more control elements are graphical control elements on a display screen of the resident controller.

11. The method of claim 1, wherein the one or more control elements are audio control elements that are configured via a voice input.

12. The method of claim 1, wherein the first presence value indicates that some users, including a primary user, are at the specified location, the primary user having full permissions.

13. The method of claim 1, further comprising generating an access list for the environment model, wherein the access list designates a permission level for each user of the plurality of users to control an automation for at least one resident device of a plurality of resident devices.

14. The method of claim 1, further comprising receiving, via the interface, a selection of the resident device of the plurality of resident devices, an automation for the selected resident device from a plurality of automations, and a triggering condition based at least in part on a presence state of the specified location.

15. A system comprising:

a resident controller including one or more processors; and one or more non-transitory computer-readable storage mediums containing instructions to cause the one or more processors to perform operations including:

registering a plurality of mobile devices of a plurality of users to receive location information of the plurality of mobile devices for determining a user location of one or more of the plurality of users;

registering a device profile for a resident device to be controlled based at least in part on the user location of the one or more of the plurality of users, the resident device within a specified location and communicably coupled with the resident controller;

generating one or more graphical control elements on a display screen of the resident controller, the one or more graphical control elements selectable by a user to configure an environment model and program an automated environment using the environment model, wherein at least one of the one or more graphical control elements specify the user location of the one or more of the plurality of users corresponding to a user state, wherein the environment model specifies access of the plurality of mobile devices and actions of one or more accessories;

establishing a user state for each of the plurality of users based on the location information obtained from the plurality of mobile devices, wherein each user state specifies whether a corresponding user is within the specified location;

updating a presence state of the specified location based on changes to the user state of the plurality of users, wherein the device profile specifies a first action to be performed when the presence state of the specified location transitions to a first presence value; and in response to the presence state changing to the first presence value, sending a control signal to the resident device to perform the first action in accordance with the environment model.

16. The system of claim 15, wherein the one or more non-transitory computer-readable storage mediums further contain instructions to cause the one or more processors to perform operations including:

instructions to cause the one or more processors to perform operations including:

receiving a boundary-crossing signal from at least one of the plurality of mobile devices, wherein a boundary-crossing signal specifies when one of the plurality of mobile devices crosses a boundary around the specified location;

updating user state based on the boundary-crossing signal; and updating the presence state of the specified location based on updated changes to the user state.

17. The system of claim 15, wherein the first presence value is that the user state of all of the plurality of users indicate presence within the specified location.

18. The system of claim 15, wherein each user corresponds to one mobile device.

19. The system of claim 15, wherein the resident controller comprises a device located within the specified location.

20. The system of claim 15, wherein the first action corresponds to:

performing an automation of the resident device at the specified location; or sending a notification to one or more of the mobile devices, the notification corresponding to the presence state or a status of the resident device.

21. The system of claim 15, wherein the first action is based at least in part on the first presence value and at least one or more of a time of day, day of week, or an event from a resident device.

22. A non-transitory computer-program product tangibly embodied in a machine-readable non-transitory storage medium including instructions to cause a processor to:

register a plurality of mobile devices of a plurality of users to receive location information of the plurality of mobile devices for determining a user location of one or more of the plurality of users;

register a device profile for a resident device of a plurality of resident devices to be controlled based at least in part on the user location of the one or more of the plurality of users, the resident device within a specified location and communicably coupled with a resident controller;

generate an interface having a plurality of graphical control elements corresponding to the plurality of resident devices, the plurality of graphical control elements selectable by a user to configure an environment model and program an automated environment using the environment model, wherein at least one of the plurality of graphical control elements specify the user location of the one or more of the plurality of users corresponding to a user state, wherein the environment model specifies access of the plurality of mobile devices and actions of the plurality of resident devices;

establish a user state for each of the plurality of users based on the location information obtained from the plurality of mobile devices, wherein each user state specifies whether a corresponding user is within the specified location;

update a presence state of the specified location based on changes to the user state of the plurality of users, wherein the device profile specifies a first action to be performed when the presence state of the specified location transitions to a first presence value; and in response to the presence state changing to the first presence value, send a control signal to the resident device to perform the first action in accordance with the environment model.

23. The non-transitory computer-program product of claim 22, wherein the instructions further cause the processor to perform:

receiving a boundary-crossing signal from at least one of the plurality of mobile devices, wherein a boundary-crossing signal specifies when one of the plurality of mobile devices crosses a boundary around the specified location;

updating user state based on the boundary-crossing signal; and updating the presence state of the specified location based on updated changes to the user state.

24. The non-transitory computer-program product of claim 22, wherein the first presence value is that the user state of all of the plurality of users indicate presence within the specified location.

25. The non-transitory computer-program product of claim 22, wherein the resident controller comprises a device located within the specified location.

26. The non-transitory computer-program product of claim 22, wherein the first action corresponds to:

performing an automation of the resident device at the specified location; or sending a notification to one or more of the mobile devices, the notification corresponding to the presence state or a status of the resident device.

27. The non-transitory computer-program product of claim 22, wherein the first action is based at least in part on the first presence value and at least one or more of a time of day, day of week, or an event from a resident device.

28. A method of controlling devices at a specified location, the method comprising performing, by a resident controller:

registering a plurality of mobile devices of a plurality of users to receive location information of the plurality of mobile devices for determining a user location of one or more of the plurality of users;

registering a device profile for a resident device of a plurality of resident devices to be controlled based on the user location of the one or more of the plurality of users, the resident device communicably coupled with the resident controller that is within the specified location;

generating an interface having a plurality of graphical control elements corresponding to the plurality of resident devices, the plurality of graphical control elements selectable by a user to configure an environment model and program an automated environment using the environment model, wherein at least one of the plurality of graphical control elements specify the user location of the one or more of the plurality of users corresponding to a user state, wherein the environment model specifies access of the plurality of mobile devices and actions of the plurality of resident devices;

establishing a user state for each of the plurality of users based on the location information obtained from the plurality of mobile devices, wherein the user state specifies whether the user is within the specified location;

receiving boundary-crossing signals from the plurality of mobile devices, wherein a boundary-crossing signal specifies when one of the mobile device crosses a boundary around the specified location;

updating the user state based on the boundary-crossing signals;

updating a presence state of the specified location based on changes to the user state, wherein the device profile specifies a first action to be performed when the presence state transitions to a first presence value; and sending a control signal to the resident device to perform the first action in accordance with the environment model when the presence state changes to the first presence value.

29. A method of controlling devices at a location, the method comprising performing, by a resident controller:

registering a plurality of mobile devices of a plurality of users to receive location information of the plurality of mobile devices for determining a location of one or more of the plurality of users;

registering a device profile for a resident device of a plurality of resident devices to be controlled based at least in part on the location of the one or more of the plurality of users, the resident device within a location and communicably coupled with the resident controller;

generating an interface having a plurality of control elements corresponding to the plurality of resident devices, the plurality of control elements selectable by a user to configure an environment model and control an automated environment using the environment model, wherein the environment model specifies access of the plurality of mobile devices for controlling the plurality of resident devices;

establishing a user state for each of the plurality of users, wherein each user state specifies whether a corresponding user is within the location;

establishing a presence state of the location based on the user state of each of the plurality of users, the presence state defining a user occupancy within the location indicates that some users, including a primary user, are at the location, the primary user having full permissions; and performing an action in accordance with the environment model based on the presence state.

* * * * *